US012310901B2

(12) United States Patent
Bouchard

(10) Patent No.: US 12,310,901 B2
(45) Date of Patent: May 27, 2025

(54) COUPLING SYSTEMS FOR RELEASABLY COUPLING EQUIPMENT TO A PATIENT TRANSPORT SYSTEMS

(71) Applicant: TECHNOLOGIES CGC INC., Quebec (CA)

(72) Inventor: Carl Bouchard, Quebec (CA)

(73) Assignee: TECHNOLOGIES CGC INC., Quebec (CA)

( * ) Notice: Subject to any disclaimer, the term of this patent is extended or adjusted under 35 U.S.C. 154(b) by 0 days.

(21) Appl. No.: 17/802,299

(22) PCT Filed: Feb. 26, 2021

(86) PCT No.: PCT/CA2021/050253
§ 371 (c)(1),
(2) Date: Aug. 25, 2022

(87) PCT Pub. No.: WO2021/168586
PCT Pub. Date: Sep. 2, 2021

(65) Prior Publication Data

US 2023/0096795 A1 Mar. 30, 2023

Related U.S. Application Data

(60) Provisional application No. 62/983,075, filed on Feb. 28, 2020.

(51) Int. Cl.
*A61G 5/10* (2006.01)
*A61G 7/05* (2006.01)
*A61G 1/04* (2006.01)

(52) U.S. Cl.
CPC ................ *A61G 5/10* (2013.01); *A61G 7/05* (2013.01); *A61G 1/04* (2013.01)

(58) Field of Classification Search
CPC ............... A61G 5/10; A61G 7/05; A61G 1/04
(Continued)

(56) References Cited

U.S. PATENT DOCUMENTS 4,511,158 A 4/1985 Varga et al.
4,887,784 A * 12/1989 Kayali ................ F16M 13/022 248/231.51

(Continued)

FOREIGN PATENT DOCUMENTS

DE 102017110001 A1 11/2018

OTHER PUBLICATIONS

Supplementary European Search Report issued in co-pending European patent application No. 2176149.3 on Feb. 23, 2024.

(Continued)

*Primary Examiner* — Peter N Helvey
(74) *Attorney, Agent, or Firm* — BCF LLP

(57) ABSTRACT

Coupling system comprising: a base member connectable to a patient transport system, and a positioning member releasably couplable to the base member and equipment; the base member comprising: a recessed portion for receiving a positioning member end portion and having an opening defined in a base; and a retractable stop member in the recessed portion and moveable between extended and recessed positions and which is resiliently biased to the extended position; the positioning member comprising: an end portion receivable in the recessed portion and engageable with the retractable stop member when the positioning member is positioned in the recessed portion.

20 Claims, 19 Drawing Sheets

(58) Field of Classification Search
USPC .......... 224/407
See application file for complete search history.

(56) References Cited

U.S. PATENT DOCUMENTS 4,888,922 A * 12/1989 Lancelot .......... E04G 15/04 52/223.1
4,892,279 A * 1/1990 Lafferty .......... F16M 11/42 248/125.8
4,901,967 A * 2/1990 Petre .......... F16M 13/027 248/327
4,905,882 A * 3/1990 Ross .......... A61M 5/1415 224/265
4,905,944 A * 3/1990 Jost .......... A61M 5/1415 248/129
4,915,435 A * 4/1990 Levine .......... A61G 3/001 29/428
4,925,444 A * 5/1990 Orkin .......... A61M 39/04 604/80
4,945,592 A * 8/1990 Sims .......... A61M 5/1415 248/129
4,966,340 A * 10/1990 Hunter .......... F16M 13/02 5/507.1
4,969,768 A * 11/1990 Young .......... F16M 13/022 403/97
4,974,377 A * 12/1990 Dominitz .......... F16B 39/22 52/143
4,997,150 A * 3/1991 Mardollo .......... A47C 3/30 248/161
5,007,608 A * 4/1991 Carroll, Jr. .......... A47B 57/34 248/297.21
5,016,307 A * 5/1991 Rebar .......... A61G 7/0503 5/503.1
5,078,349 A * 1/1992 Smith .......... A61M 5/1415 403/109.5
5,083,807 A * 1/1992 Bobb .......... A61G 5/10 248/231.51
5,094,418 A * 3/1992 McBarnes, Jr. .......... A61G 7/0503 248/308
5,110,076 A * 5/1992 Snyder .......... F16M 11/28 248/408
5,112,019 A * 5/1992 Metzler .......... A61M 3/0266 248/176.1
5,125,607 A * 6/1992 Pryor .......... F16M 11/28 248/129
5,135,191 A * 8/1992 Schmuhl .......... A61M 5/1415 248/129
5,149,036 A * 9/1992 Sheehan .......... F16L 3/02 248/304
5,152,486 A 10/1992 Kabanek et al.
5,157,409 A * 10/1992 Hamin .......... H01Q 1/3258 343/715
5,207,303 A * 5/1993 Oswalt .......... A61B 50/312 206/570
5,207,642 A * 5/1993 Orkin .......... A61M 5/16827 604/905
5,219,139 A * 6/1993 Hertzler .......... A61G 5/10 248/276.1
5,224,681 A * 7/1993 Lundstrom .......... F16B 2/246 24/522
5,306,109 A * 4/1994 Kreuzer .......... F16M 11/041 414/349
5,319,816 A * 6/1994 Ruehl .......... A61G 7/0509 5/600
5,326,059 A * 7/1994 Pryor .......... F16M 11/28 248/231.71
5,337,992 A * 8/1994 Pryor .......... A61M 5/1415 248/219.2
5,344,169 A * 9/1994 Pryor .......... A61G 12/008 5/503.1
5,362,021 A 11/1994 Phillips
5,366,191 A * 11/1994 Bekanich .......... F16M 13/02 403/328
5,383,629 A * 1/1995 Morgan .......... B64D 11/00 244/118.6
5,392,350 A * 2/1995 Swanson .......... B60R 11/02 379/426
5,400,995 A * 3/1995 Boyd .......... A61M 5/1415 248/407
5,407,163 A * 4/1995 Kramer .......... A61G 7/0503 5/503.1
5,421,548 A * 6/1995 Bennett .......... A61G 12/008 5/503.1
5,425,520 A * 6/1995 Masumoto .......... A47B 96/06 403/231
5,490,703 A * 2/1996 Hewko .......... A61G 3/0254 244/118.6
5,527,125 A * 6/1996 Kreuzer .......... A61G 12/00 5/503.1
5,556,065 A * 9/1996 Wadley .......... A61M 5/1415 248/129
5,588,166 A * 12/1996 Burnett .......... F16L 3/1075 5/503.1
5,615,848 A * 4/1997 Ceriani .......... A61G 3/0236 296/65.09
5,618,090 A * 4/1997 Montague .......... F16M 11/2014 312/246
5,626,320 A * 5/1997 Burrell .......... B64D 43/00 248/231.71
5,647,491 A * 7/1997 Foster .......... A61G 13/107 211/74
5,657,884 A * 8/1997 Zilincar, III .......... A47F 5/0815 211/86.01
5,664,750 A * 9/1997 Cohen .......... F16M 11/041 248/231.71
5,699,988 A * 12/1997 Boettger .......... A61G 7/05 248/316.1
5,704,577 A * 1/1998 Gordon .......... F16B 7/0493 248/230.1
5,732,867 A * 3/1998 Perkins .......... A45F 3/08 224/628
5,732,965 A * 3/1998 Willey .......... B62J 17/04 280/288.4
5,738,306 A * 4/1998 Moss .......... B64D 9/00 244/118.6
5,755,478 A * 5/1998 Kamiya .......... B60P 3/14 5/81.1 HS
5,779,296 A * 7/1998 Hewko .......... A61G 3/0866 244/118.6
5,785,277 A * 7/1998 Manning .......... B64D 9/00 244/118.6
5,815,629 A * 9/1998 Finzel .......... G02B 6/4442 385/134
5,829,723 A * 11/1998 Brunner .......... A61M 5/1415 248/222.13
5,833,095 A * 11/1998 Russell .......... A45F 5/02 224/684
5,850,891 A * 12/1998 Olms .......... B60R 9/0423 224/310
5,857,685 A * 1/1999 Phillips .......... A61M 5/1415 280/47.35
5,865,314 A * 2/1999 Jacober .......... A61J 1/165 62/457.2
5,876,016 A * 3/1999 Urban .......... A61M 3/0266 604/246
5,878,536 A * 3/1999 Demmitt .......... A61G 12/002 312/209
5,886,674 A * 3/1999 Yoshimi .......... H01Q 1/088 343/882
5,898,961 A * 5/1999 Ambach .......... A61G 7/05 292/108
5,924,658 A * 7/1999 Shiery .......... F16B 7/1409 248/161
5,966,760 A * 10/1999 Gallant .......... A61M 16/10 5/503.1
5,987,670 A * 11/1999 Sims .......... A61G 5/10 5/503.1
5,988,409 A * 11/1999 Gusdorf .......... A47B 96/16 211/90.01

(56) References Cited

U.S. PATENT DOCUMENTS 5,996,957 A * 12/1999 Kurtz ................. A47G 23/0225 248/231.21
6,000,509 A * 12/1999 Chisholm .............. A45C 13/02 190/110
6,056,249 A * 5/2000 Fillon, Jr. ........... A61M 5/1415 248/125.7
6,155,743 A * 12/2000 Chen ..................... F16B 7/1418 403/374.1
6,157,350 A * 12/2000 House .................... H01Q 1/084 343/702
6,170,102 B1 * 1/2001 Kreuzer ................. A61G 13/10 5/601
6,179,260 B1 * 1/2001 Ohanian .................. A61G 7/05 403/374.1
6,182,662 B1 * 2/2001 McGhee ............. A61M 5/1415 128/877
6,213,481 B1 * 4/2001 Marchese .......... F16M 11/2014 280/47.35
6,231,016 B1 * 5/2001 Slone .................. A61M 5/1414 248/200.1
6,241,109 B1 * 6/2001 Kautz .................... A47B 57/50 403/329
6,244,400 B1 * 6/2001 Bowers .................... A45C 3/02 190/110
6,244,553 B1 * 6/2001 Wang ................. F16M 11/2021 379/454
6,273,366 B1 * 8/2001 Sprenger ................ B64D 11/00 244/118.6
6,296,094 B1 * 10/2001 Knecht ................ A45C 7/0095 206/281
6,315,182 B1 * 11/2001 Chen ......................... A45F 5/00 224/547
6,317,497 B1 * 11/2001 Ou .......................... H04M 1/12 439/165
6,366,672 B1 * 4/2002 Tsay .................... B60R 11/0241 379/446
6,367,603 B1 * 4/2002 Tiramani ............ E05B 65/5276 190/115
6,375,133 B1 * 4/2002 Morrow .............. A61M 5/1415 5/503.1
6,390,311 B1 * 5/2002 Belokin .............. A61M 5/1415 248/129
6,390,424 B1 * 5/2002 Kidushim .............. F16M 11/24 248/404
6,394,403 B1 * 5/2002 Hung ................... F16M 13/022 248/278.1
6,434,329 B1 * 8/2002 Dube ................. F16M 11/2092 396/428
6,585,188 B2 * 7/2003 Alli .......................... B64D 9/00 244/118.6
6,592,090 B1 * 7/2003 Li .......................... F16M 13/00 248/921
6,595,379 B1 * 7/2003 Powell .................... F16B 21/09 403/321
6,601,860 B2 * 8/2003 Potter .................. A61G 1/0212 280/47.35
6,618,018 B1 * 9/2003 Sylvester .................. B60R 9/00 343/715
6,708,991 B1 * 3/2004 Ortlieb ................ A61M 5/1415 248/122.1
6,725,483 B2 * 4/2004 Gallant ................. A61M 16/10 5/503.1
6,726,075 B1 * 4/2004 Patel ......................... A45F 3/14 224/582
6,746,138 B1 * 6/2004 Neeld ..................... F21V 21/02 248/219.2
6,762,727 B2 * 7/2004 Rochford ............. H01Q 1/3275 24/289
6,769,657 B1 * 8/2004 Huang ................. F16M 13/022 248/278.1
6,789,714 B1 * 9/2004 Benson .................... B25H 3/04 224/543
6,896,231 B1 * 5/2005 Sullivan, Sr. .......... F16M 13/02 248/278.1
6,945,414 B1 * 9/2005 Stevens ................. A47F 5/0846 211/183
6,962,306 B2 * 11/2005 West ...................... B65H 75/06 242/405.2
7,048,242 B2 * 5/2006 Oddsen, Jr. ............ F16M 11/24 248/917
7,097,204 B2 * 8/2006 Jessup ....................... B60P 3/39 5/118
7,135,634 B2 * 11/2006 Chen ...................... F16M 13/00 84/453
7,150,058 B2 * 12/2006 Rabska .................. A61G 7/053 5/503.1
7,234,619 B2 * 6/2007 Hicks ...................... B60R 7/046 224/543
7,507,005 B1 * 3/2009 Mier-Langner ......... F21V 21/35 439/111
7,510,155 B2 * 3/2009 Huang ............... F16M 11/2014 248/278.1
7,546,993 B1 * 6/2009 Walker ................... F16M 11/24 248/229.12
7,600,619 B2 * 10/2009 Sapyta ................... A45C 13/02 190/110
7,654,834 B1 * 2/2010 Mier-Langner ........ H01R 25/14 439/111
7,669,816 B2 * 3/2010 Crain ..................... F16M 11/10 248/183.3
7,669,945 B2 * 3/2010 Blersch ................. F25D 23/067 108/107
7,677,400 B2 * 3/2010 Bayazit ............. G02B 6/44524 211/26
7,793,902 B2 * 9/2010 Buchanan ........... A61M 5/1415 248/219.2
7,798,323 B1 * 9/2010 McCann ................. A61F 17/00 206/370
7,946,771 B2 * 5/2011 Boneschanscher .... F16M 13/00 396/419
7,984,889 B2 * 7/2011 Whitley ................. F16M 11/16 248/222.12
8,020,825 B2 * 9/2011 Dostaler ............ A47G 23/0225 248/229.13
8,167,131 B1 * 5/2012 Anderson ................. A45F 3/02 190/102
8,167,259 B2 * 5/2012 Spang, Jr. ........... A61M 39/283 248/230.4
8,172,077 B1 * 5/2012 Gray ........................ B25H 1/04 190/18 R
8,261,954 B2 * 9/2012 Lee ..................... B60R 11/0258 224/558
8,276,795 B1 * 10/2012 Dean ....................... F42B 39/22 224/543
8,387,783 B2 * 3/2013 Zack ...................... A47K 3/001 206/77.1
8,449,502 B2 * 5/2013 Pratt ..................... A61J 1/1462 604/151
8,505,794 B2 * 8/2013 Ardigo ...................... B60R 7/08 224/543
8,701,952 B1 * 4/2014 Tripp ...................... B60R 11/06 224/543
8,807,376 B1 * 8/2014 Mastors .............. A61M 5/1414 220/751
9,078,501 B2 * 7/2015 Johnson ................. A45C 13/02
9,282,794 B2 * 3/2016 Farrelly ................... A45C 5/14
9,746,125 B2 8/2017 Bowman
9,861,178 B1 * 1/2018 Vanman .................... A45F 3/00
11,007,951 B1 5/2021 Zarecky
2002/0011543 A1 1/2002 Chinn et al.
2002/0047075 A1 * 4/2002 Metz .................... A61G 12/008 211/113
2002/0104934 A1 * 8/2002 Elliott ................. A61M 5/1415 248/407
2003/0014817 A1 * 1/2003 Gallant ................ A61G 7/0513 5/658
2003/0037375 A1 * 2/2003 Riley ................. H01R 13/6276 5/503.1

(56) References Cited

U.S. PATENT DOCUMENTS

2003/0046764 A1 3/2003 Smeed
2003/0143052 A1* 7/2003 Fehrle ........ B64C 1/20 410/46
2003/0150445 A1* 8/2003 Power ........ A61M 16/049 128/200.14
2003/0201370 A1* 10/2003 Ron ........ F16C 11/10 248/276.1
2004/0178309 A1* 9/2004 Crowley ........ A47B 96/028 248/247
2004/0199999 A1* 10/2004 Landry ........ A47D 15/008 5/494
2004/0253856 A1* 12/2004 Hoffmann ........ H01R 13/506 439/119
2005/0000019 A1* 1/2005 Newkirk ........ A61G 7/0503 5/503.1
2005/0006542 A1* 1/2005 Henning ........ F16M 11/2064 248/274.1
2005/0039644 A1* 2/2005 Sheahan ........ F16B 12/30 108/152
2005/0230575 A1 10/2005 Zelenski et al.
2005/0232519 A1* 10/2005 Grimes ........ D06F 95/006 383/117
2006/0242763 A1* 11/2006 Graham ........ A61G 12/004 5/503.1
2006/0243766 A1* 11/2006 Lan ........ A45C 13/02 224/929
2006/0255221 A1* 11/2006 Tseng ........ A47B 57/567 248/235
2006/0278785 A1* 12/2006 Wiesner ........ F16M 11/24 248/231.71
2007/0056921 A1* 3/2007 Lo ........ F16M 11/046 211/94.01
2007/0097617 A1* 5/2007 Searby ........ F16M 11/041 361/679.21
2007/0215766 A1* 9/2007 Yen ........ B60R 11/02 248/205.8
2007/0267550 A1* 11/2007 Blankenship ........ A61G 12/008 248/161
2008/0023976 A1* 1/2008 Myers ........ A61G 3/0891 296/19
2008/0061195 A1* 3/2008 Carnevali ........ F16M 11/28 248/125.8
2008/0073477 A1* 3/2008 Lang ........ B60R 1/072 248/476
2008/0121730 A1* 5/2008 Calkin ........ A45F 3/06 383/22
2008/0179478 A1* 7/2008 Lee ........ B60R 11/00 248/276.1
2008/0217910 A1 9/2008 Walke et al.
2008/0272254 A1* 11/2008 Harr ........ F16M 13/022 248/218.4
2008/0302553 A1* 12/2008 Ross ........ H01R 25/142 174/95
2009/0014584 A1* 1/2009 Rudduck ........ B60N 2/0725 244/118.6
2009/0140112 A1* 6/2009 Carnevali ........ F16B 21/09 248/223.41
2009/0165208 A1* 7/2009 Reed ........ A61G 1/0287 702/141
2010/0249513 A1* 9/2010 Tydlaska ........ A61B 1/00052 248/219.4
2010/0307649 A1* 12/2010 Santos Dominguez ........ A61B 50/312 190/109
2010/0314517 A1* 12/2010 Patzer ........ A61M 5/1415 248/230.3
2011/0121149 A1* 5/2011 Herskovic ........ A61G 7/0503 248/223.41
2011/0147428 A1* 6/2011 Crawford ........ A45C 11/24 224/245
2012/0006873 A1* 1/2012 Chinn ........ A61G 3/0866 224/545
2012/0032038 A1* 2/2012 Ye ........ F16M 11/105 248/122.1
2012/0126075 A1* 5/2012 Chinn ........ A61G 1/04 248/221.11
2012/0234992 A1* 9/2012 Vanover ........ H01Q 1/1207 248/201
2012/0262039 A1 10/2012 Daugbjerg et al.
2013/0081233 A1* 4/2013 Lu ........ B60P 7/0815 24/185
2013/0134196 A1* 5/2013 Lee ........ B62J 50/225 224/448
2013/0193179 A1* 8/2013 Davidson ........ B60R 7/043 224/584
2014/0016503 A1* 1/2014 Altekar ........ H01R 25/142 370/254
2014/0027596 A1* 1/2014 Chang ........ A45B 1/00 248/333
2014/0226315 A1* 8/2014 Nicieja ........ H01R 25/147 362/127
2014/0227892 A1* 8/2014 Chinn ........ H01R 25/165 439/116
2014/0231605 A1* 8/2014 Sharpe ........ F16B 2/065 248/228.6
2014/0263502 A1* 9/2014 Byham ........ B60R 7/043 224/275
2014/0374564 A1* 12/2014 Schroeder ........ B60P 7/0815 248/503
2014/0374565 A1 12/2014 Tan
2015/0034789 A1* 2/2015 Ferguson ........ F16M 11/2021 248/371
2015/0041419 A1 2/2015 Hasegawa
2015/0090849 A1 4/2015 Breitweiser et al.
2015/0273138 A1 10/2015 Wolff et al.
2015/0344089 A1* 12/2015 Bopanna ........ H01F 7/0252 224/430
2016/0031382 A1* 2/2016 Chinn ........ A61B 90/50 29/428
2016/0324701 A1 11/2016 Cambridge et al.
2017/0020249 A1* 1/2017 Schroeder ........ A45C 13/02
2017/0021775 A1* 1/2017 Spector ........ B60R 11/06
2017/0202330 A1* 7/2017 Schroeder ........ B60R 11/06
2017/0209318 A1* 7/2017 Schroeder ........ F16M 13/022
2017/0215979 A1 8/2017 Childs et al.
2018/0073676 A1* 3/2018 Schroeder ........ B60R 11/00

OTHER PUBLICATIONS

International Search Report and written opinion issued in corresponding International application No. PCT/CA2021/050253 on May 19, 2021.

* cited by examiner

COUPLING SYSTEMS FOR RELEASABLY COUPLING EQUIPMENT TO A PATIENT TRANSPORT SYSTEMS

CROSS-REFERENCE TO RELATED APPLICATIONS

This application is a National Phase Entry of international PCT patent application No. PCT/CA2021/050253 filed on Feb. 26, 2021, which claimed the benefit of priority of U.S. provisional patent application no. 62/983,075 filed on Feb. 28, 2020. The contents of the above-noted applications are incorporated herein by reference in their entirety.

FIELD OF THE DISCLOSURE

The present disclosure relates to coupling systems for releasably coupling equipment to a patient transport system, such as, but not limited to coupling medical equipment to personal transportation systems such as stretchers, wheelchairs or portable beds.

BACKGROUND OF THE DISCLOSURE

Patient transportation systems include, for example, stretchers, wheelchairs and portable beds. Oftentimes, along with transporting the patient, there is often a need to transport equipment associated with the patient.

A number of factors must be taken into account when such equipment includes medical equipment relating to the patient. Medical equipment must be secured during transportation to prevent injuries as well as damage to the equipment. Medical equipment can be heavy and cumbersome and often lack handles for ease of transportation. The manner of securing the equipment must not restrict access to either the equipment or the patient, and should allow the medical equipment to be installed and removed easily.

Current solutions for mounting medical equipment to patient transportation systems include attaching the medical equipment near the patient with straps or seat belts. The medical equipment is also sometimes placed on the patients themselves.

However, these current solutions are far from ideal. They do not secure the medical equipment in a manner which allows for one or more of: quick release, quick attachment, secure attachment, ease of access to the secured medical equipment, and takes into account the cumulative weight of the equipment.

Therefore, there is a need for coupling systems for releasably coupling equipment to a patient transport system which overcome or reduce at least some of the above-described problems.

SUMMARY OF THE DISCLOSURE

Broadly, there is provided a coupling system for releasably coupling equipment to a patient transport system, the coupling system comprising: a base member connectable to the patient transport system, and a positioning member connectable to the equipment, the positioning member arranged to be releasably coupled to the base member; the base member comprising: a recessed portion for receiving an end portion of the positioning member, the recessed portion having a base with an opening defined therein; and a retractable stop member in the recessed portion and moveable between: an extended position in which the retractable stop member extends into the recessed portion through the opening, and a recessed position in which the retractable stop member is retracted from the recessed portion through the opening, the retractable stop member being resiliently biased to the extended position; the positioning member comprising: an end portion sized and shaped to be received in the recessed portion of the positioning member and to engage with the retractable stop member when the positioning member is positioned in the recessed portion.

In certain embodiments, the coupling system further comprises an actuation system for actuating the retractable stop member between the extended position and the retracted position.

In certain embodiments, the actuation system comprises an actuator for moving the retractable stop member to the retracted position from the extended position, and a resilient member for resiliently biasing the retractable stop member towards the extended position. In certain embodiments, the actuator is a handle connected to the retractable stop member by at least one pin, optionally two pins, and the resilient member is a spring.

In certain embodiments, the base member has a three part configuration, (i) an upper portion; (ii) a lower portion connected to the upper portion, and (iii) a retractable stop member portion, including the retractable stop member, moveably arranged between the upper portion and the lower portion.

In certain embodiments, the upper portion comprises an upper body having the recessed portion defined therein; the lower portion comprises a lower body having an upper face, the upper face being adapted to moveably house the retractable stop member portion in a recess; and the retractable stop member portion comprises a plate portion, sized and shaped to be received in the recess of the upper face of the lower body, and the retractable stop member extending upwardly from the plate portion.

In certain embodiments, the plate portion of the retractable stop member portion comprises an opening for movingly receiving the pin.

In certain embodiments, the recessed portion is defined by a wall extending circumferentially around the base, there being provided an open access area without the wall through which the positioning member can be inserted and removed. In certain embodiments, the recessed portion has a plurality of sides, and the wall extends along all but one of the plurality of sides which is the open access end.

In certain embodiments, the retractable stop member has a wedge configuration having a decreasing height towards the open access end.

In certain embodiments, the coupling system further comprises a clamp for attaching the base member to the patient transport system. The clamp may be attachable to a portion of the base member with a fastener.

In certain other embodiments, the clamp is formed by upper and lower portions of the base member. In certain such embodiments, oppositely facing sides of the upper and lower portions define the clamp configured to close around a circumference of the frame of the patient transport system when the upper and lower portions of the base member are brought closer together.

In certain embodiments, the coupling system further comprises at least one arm extending from the base member, the at least one arm attachable to the patient transport system or being integral with the patient transport system.

In certain embodiments, the positioning member end portion comprises an opening for receiving the retractable stop member when the retractable stop member is in the extended position.

In certain embodiments, the coupling system further comprises an equipment frame to which the positioning member is attached or attachable, the equipment frame also being adapted to attach the equipment thereto. The equipment frame is also configured to be attachable to the patient transport system, such as a frame of a stretcher, for example. In certain embodiments, the equipment frame is attachable to the frame of the patient transport system by at least one guide member. The at least one guide member may be detachably attachable to the frame, such as by clamping or fasteners.

In certain embodiments, when assembled, the positioning member and the base member are removably coupled together, the at least one guide member is attached to the frame of the patient transport system, the positioning member is attached to an equipment frame which is removably engaged with the at least one guide member. The equipment frame may comprise two arms, each arm being configured to be received in a pair of guide members which are axially aligned and attached to the frame along one side of a stretcher.

In certain embodiments, the at least one guide member comprises a first opening for receiving the frame of the patient transport system, and a second opening for receiving an arm of the equipment frame. The at least one guide member may comprise two parts connectable together by one or more fasteners, the first opening being defined by the two parts. The second opening may be formed within a guide member body of the guide member.

In certain embodiments, the equipment frame includes at least one base member of a connecting device, the at least one base member of the connecting device being attachable, or being attached, to the equipment.

In certain embodiments, the equipment frame comprises a cross-bar to which the base member is attached.

In certain embodiments, the equipment frame comprises at least one horizontal arm extending substantially transversely to the cross-bar and engageable with the at least one guide member on the patient transport system.

In certain embodiments, the equipment frame comprises at least one vertical arm extending from the cross-bar.

In certain embodiments, the equipment frame comprises at least one support surface for supporting medical equipment.

In certain embodiments, the connecting device comprises a base member (which can also be referred to herein as a connecting device base member) connectable to the equipment frame, and a release member connectable to the equipment, the base member and the release member being releasably connectable together in a coupled position. The coupled position can be locked in certain embodiments. The base member may have a front face including a contact portion for contacting a contact face of the release member. The release member may comprise a body which is configured to be received in a pocket on the front face of the base member, when the base member and the release member are in the coupled position, the pocket having an open access end through which the release member can be slidingly inserted and removed from the pocket. The base member may include a stop member moveable, by an actuator, between a lock position in which the stop member interengages with the release member to prevent removal of the release member from the pocket of the base member, and a release position in which the release member can be separated from the base member.

In certain embodiments, the base member has a shoulder extending around the contact portion to define the pocket for receiving the release member, the shoulder engageable with a portion of a flange of the release member when the release member is positioned on the base member.

In certain embodiments, the stop member is positioned in a recess within the contact portion and moveable by the actuator which is connected to a resilient lock mechanism between the lock position in which at least a portion of the stop member extends from the recess and abuts an edge of an opening defined in the release member contact face in the coupled position, and a release position in which the stop member is retracted into the recess. The stop member may have a wedge shaped portion with a thinner end of the wedge facing the open access end of the pocket, and wherein the resilient lock mechanism is configured to permit the stop member to move into the recess as the release member is slid into the pocket. The actuator may have a neutral position and a deployed position, wherein when the actuator is in the neutral position, the stop member is resiliently biased towards the lock position.

In certain embodiments, a perimeter of the body of the release member is circular in shape, such that the release member can be rotated within the pocket in one or both of the lock position and the release position when the base member is coupled to the release member. The stop member may function as a rotation point and is positioned substantially centrally of the contact portion of the base member. In other embodiments, a perimeter of the body of the release member has an eccentric shape such that the release member is not rotatable in the pocket of the base member when the base member is coupled to the release member.

In certain embodiments, the shoulder is configured to delimit movement of the release member orthogonally away from the front face of the base member, when the base member and the release member are in the coupled position.

From another aspect, the connecting device comprises a base member (which can also be referred to herein as a connecting device base member) connectable to the equipment frame, and a release member connectable to the equipment, the base member and the release member being releasably connectable together in a coupled position. The release member comprises a plate-like body with a first side, the first side defining a planar contact face, and a second side having a collar extending therefrom, the collar positioned inwardly of a perimeter of the release member to define a flange portion; the base member having: a front face including a planar contact portion for contacting the contact face of the release member; a shoulder extending around a portion of a periphery of the planar portion to define a pocket for receiving the release member, the shoulder engageable with a portion of the flange of the release member when the release member is positioned on the base member; an open access end through which the release member can be slidingly inserted and removed from the pocket; a stop member positioned in a recess within the planar contact portion and moveable by a resilient lock mechanism and an actuator between a lock position in which at least a portion of the stop member extends from the recess and abuts an edge of an opening defined in the release member contact face in the coupled position, and a release position in which the stop member is retracted into the recess; the actuator having a neutral position and a deployed position, wherein when the actuator is in the neutral position, the stop member is resiliently biased towards the lock position.

In certain embodiments, the base member comprises a plurality of spring loaded ball bearings partially extending from recesses formed in the front face of the base member and engageable with corresponding recesses defined in the planar contact face of the release member.

In certain embodiments, the planar contact face of the release member has an anti-friction layer.

In certain embodiments, the coupling system further comprises a damping member attachable to a back face of the base member and arranged to be positioned between the base portion and the surface in use, the damping member being arranged to absorb vibration and/or shock.

In certain embodiments, the coupling system further comprises a top plate attachable to the collar of the release member and attachable to the equipment.

In certain embodiments, the perimeter of the plate-like body of the release member is circular in shape, the stop member of the base member is positioned substantially centrally of the planar contact portion, and the opening of the release member is positioned substantially centrally of the plate-like body, such that the release member can be rotated within the pocket when the stop member is in the lock position.

In certain embodiments, the perimeter of the plate-like body of the release member has an eccentric shape such that the release member is not rotatable in the pocket of the base member.

From another aspect, there is provided a patient transport system comprising a frame having a patient support surface attached thereto, the frame including the base member and optionally the positioning member of the coupling system. In certain embodiments, the patient transport system further includes a supporting rail assembly connected to the frame of the patient transport system by at least one guide member. The supporting rail assembly may include a support rail connected to the at least one guide member and at least one support cross member connected to the support rail. The supporting rail assembly may also be connected to the base member of the coupling system.

From another aspect, there is provided a patient transport system comprising a frame having a patient support surface attached thereto, and a supporting rail assembly connected to the frame of the patient transport system by at least one guide member. The supporting rail assembly may include a support rail connected to the at least one guide member and at least one support cross member connected to the support rail. The patient transport system may further comprise the base member connected to the frame of the patient transport system, and optionally the positioning member also connected to the frame of the patient transport system.

In certain embodiments, the patient support surface is a mattress of a stretcher.

From another aspect, there is provided a stretcher comprising a frame having a patient support surface attached thereto, the frame including the base member of the coupling system as described above.

From another aspect, there is provided an equipment frame for connecting equipment to a patient transport system, the equipment frame comprising at least one support surface for supporting the equipment, and a positioning member of the coupling system as described above.

In certain embodiments, the positioning member or the equipment frame supporting the positioning member further comprises at least one connecting device attached to the equipment frame, the at least one connecting device configured to be releasably attached to the equipment.

In certain embodiments, the positioning member or the equipment frame supporting the positioning member further comprises at least one base member of a connecting device attached to the equipment frame, the at least one connecting device base member releasably attachable to a release member of the connecting device in a coupled position, and the connecting device release member being attachable to the equipment.

In certain embodiments, the patient transport system is a personal transport system such as a stretcher. The stretcher may be for use in aircrafts, or for adapted ground use. In certain embodiments, the equipment is medical equipment.

From another aspect, there is provided a mounting system releasably attachable to a patient transport system such as a stretcher and adapted to releasably secure equipment thereto, the mounting system comprising an equipment frame; a positioning member, as described herein, attached to the equipment frame; and a connecting device release member as described herein, attached to the equipment frame.

From a yet further aspect, there is provided a patient transport system comprising an equipment frame and a patient support surface, the equipment frame having attached thereto a base member of the coupling systems described herein. In certain embodiments, the patient transport system also includes the positioning member of the coupling system described herein, and optionally one or more of: a connecting device base member, a connecting device release member, and equipment.

In certain embodiments, the connecting device release member comprises a plate-like body with a first side, the first side defining a planar contact face, and a second side having a collar extending therefrom, the collar positioned inwardly of a perimeter of the release member to define a flange portion; the connecting device base member having: a front face including a planar contact portion for contacting the contact face of the release member; a shoulder extending around a portion of a periphery of the planar portion to define a pocket for receiving the release member, the shoulder engageable with a portion of the flange of the release member when the release member is positioned on the base member; an open access end through which the release member can be slidingly inserted and removed from the pocket; a stop member positioned in a recess within the planar contact portion and moveable by a resilient lock mechanism and an actuator between a lock position in which at least a portion of the stop member extends from the recess and abuts an edge of an opening defined in the release member contact face in the coupled position, and a release position in which the stop member is retracted into the recess; the actuator having a neutral position and a deployed position, wherein when the actuator is in the neutral position, the stop member is resiliently biased towards the lock position.

In certain embodiments, the connecting device base member comprises a plurality of spring loaded ball bearings partially extending from recesses formed in the front face of the base member and engageable with corresponding recesses defined in the planar contact face of the release member.

In certain embodiments, the planar contact face of the connecting device release member has an anti-friction layer.

In certain embodiments, the connecting device base member further comprises a damping member attachable to a back face of the base member and arranged to be positioned between the base portion and the equipment frame in use, the damping member being arranged to absorb vibration and/or shock.

In certain embodiments, the connecting device base member further comprises a top plate attachable to the collar of the release member and attachable to the equipment.

In certain embodiments, the perimeter of the plate-like body of the connecting device release member is circular in shape, the stop member of the connecting device base member is positioned substantially centrally of the planar contact portion, and the opening of the connecting device release member is positioned substantially centrally of the plate-like body, such that the connecting device release member can be rotated within the pocket when the stop member is in the lock position.

In certain embodiments, the perimeter of the plate-like body of the connecting device release member has an eccentric shape such that the release member is not rotatable in the pocket of the connecting device base member.

In certain embodiments, the equipment is medical equipment which is fragile, heavy, expensive, and may be critical for sustaining or saving the life of the patient. In certain embodiments, the coupling system ensures a secure attachment of the medical equipment in close proximity to the patient. The coupling system also allows a quick and easy release of the medical equipment from the patient transportation system, requiring actuation of the handle. In certain embodiments, the patient transportation system is a personal system such as a stretcher, a wheelchair or a bed.

Embodiments of the coupling system provide a secure manner of transporting equipment with the patient transportation. The equipment can remain secured to patient transportation system during high acceleration and deceleration events, as well as travel on uneven surfaces. In certain embodiments, the equipment frame can withstand impacts of up to 30G.

Embodiments of the coupling system can enable the securing and the release of the equipment from the patient transportation system by a single person, and may not require more than one hand. Embodiments of the coupling system enable the securing of mobile equipment of different sizes, shapes and configurations to the equipment frame.

Embodiments of the coupling system enable the equipment to be easily secured to the patient transportation system by a sliding action to couple the positioning member attached to the equipment to the base member attached to the patient transportation system. Release of the equipment from the patient transportation system can be achieved by pulling a handle, or any other type of actuation. The release can be readily performed by one person.

Definitions

It must be noted that, as used in this specification and the appended claims, the singular form “a”, “an” and “the” include plural referents unless the context clearly dictates otherwise.

As used herein, the term “about” in the context of a given value or range refers to a value or range that is within 20%, preferably within 10%, and more preferably within 5% of the given value or range.

As used herein, the term “and/or” is to be taken as specific disclosure of each of the two specified features or components with or without the other. For example “A and/or B” is to be taken as specific disclosure of each of (i) A, (ii) B and (iii) A and B, just as if each is set out individually herein.

BRIEF DESCRIPTION OF DRAWINGS

Further aspects and advantages of the present technology will become better understood with reference to the description in association with the following in which.

DETAILED DESCRIPTION

Figure 1:
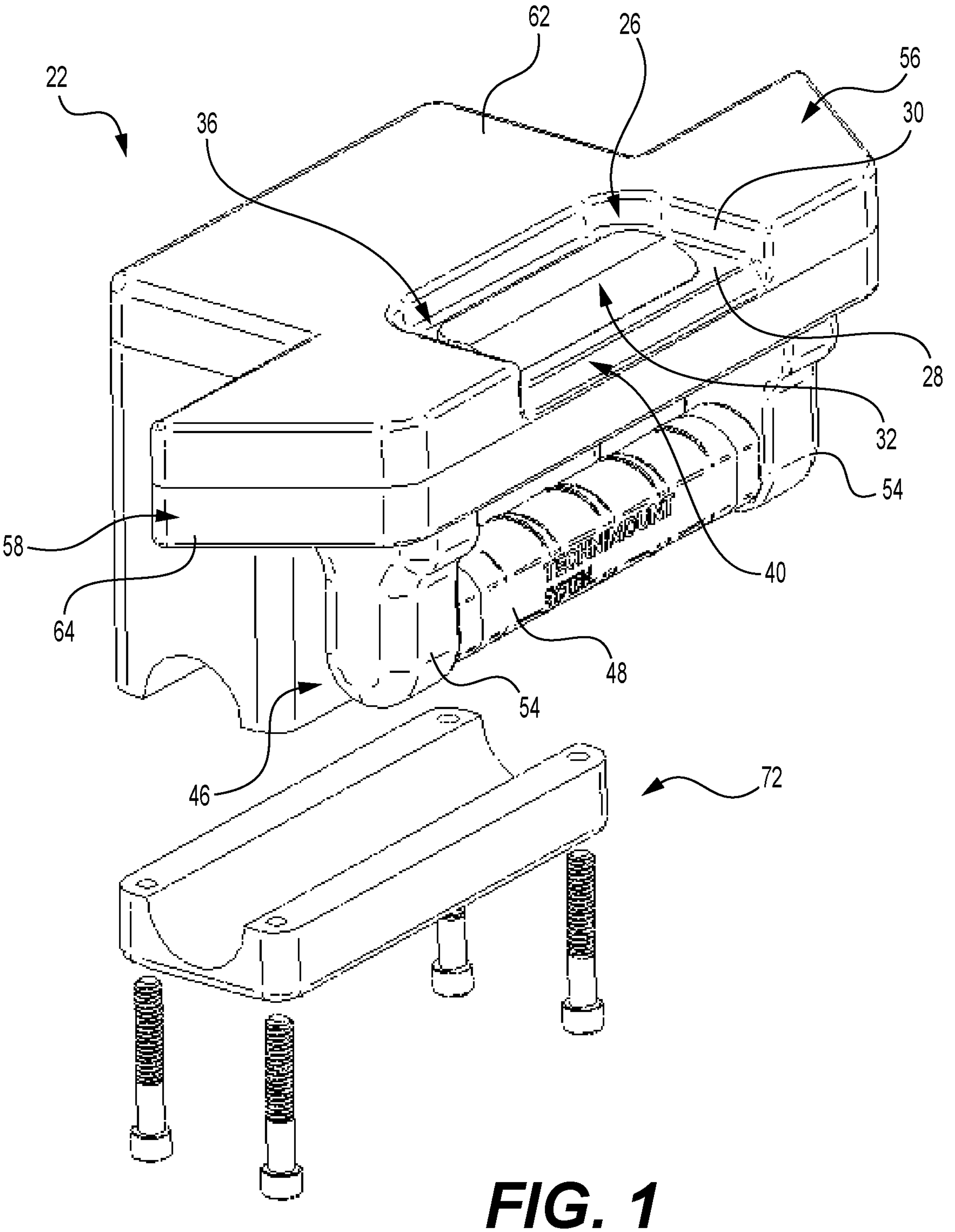
FIG. 1 is a perspective view from the top of a base member of a coupling system and including a portion in exploded view, according to certain embodiments of the present disclosure.

The present disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items. In the following description, the same numerical references refer to similar elements.

Broadly there is provided a coupling system 10 for releasably coupling equipment 12 to a patient transport system 14. In the embodiments illustrated in FIGS. 1-12 and 15, the patient transport system 14 comprises a personal transport system arranged to transport a patient. In certain embodiments, the personal transport system 14 is a stretcher. The stretcher may be a stretcher adapted for aircraft use (FIGS. 5A-C, 6 and 7) or a stretcher adapted for ground use (FIGS. 8-11). It is understood that the present technology can be used with stretchers of various configurations, such as, for instance, stretchers with narrow footprints, wide footprints, with side rails and/or arm boards. Embodiments of the coupling system 10 can also be used with other patient transport systems 14 such as wheelchairs, beds or the like (not shown).

As best seen in FIGS. 5A-C, 6 to 12 and 15, in embodiments of the present technology in which the patient transport system 14 is a stretcher, the patient transport system 14 comprises a frame 16, a support body 18 attachable to the frame 16 for supporting the patient, and optionally wheels 20 attachable to the frame 16 (FIGS. 8-12). The support body 18 may comprise a mattress removably attachable to the frame 16 by fasteners (not shown) such as a hooks, clasps, velcro, etc.

Figure 12:
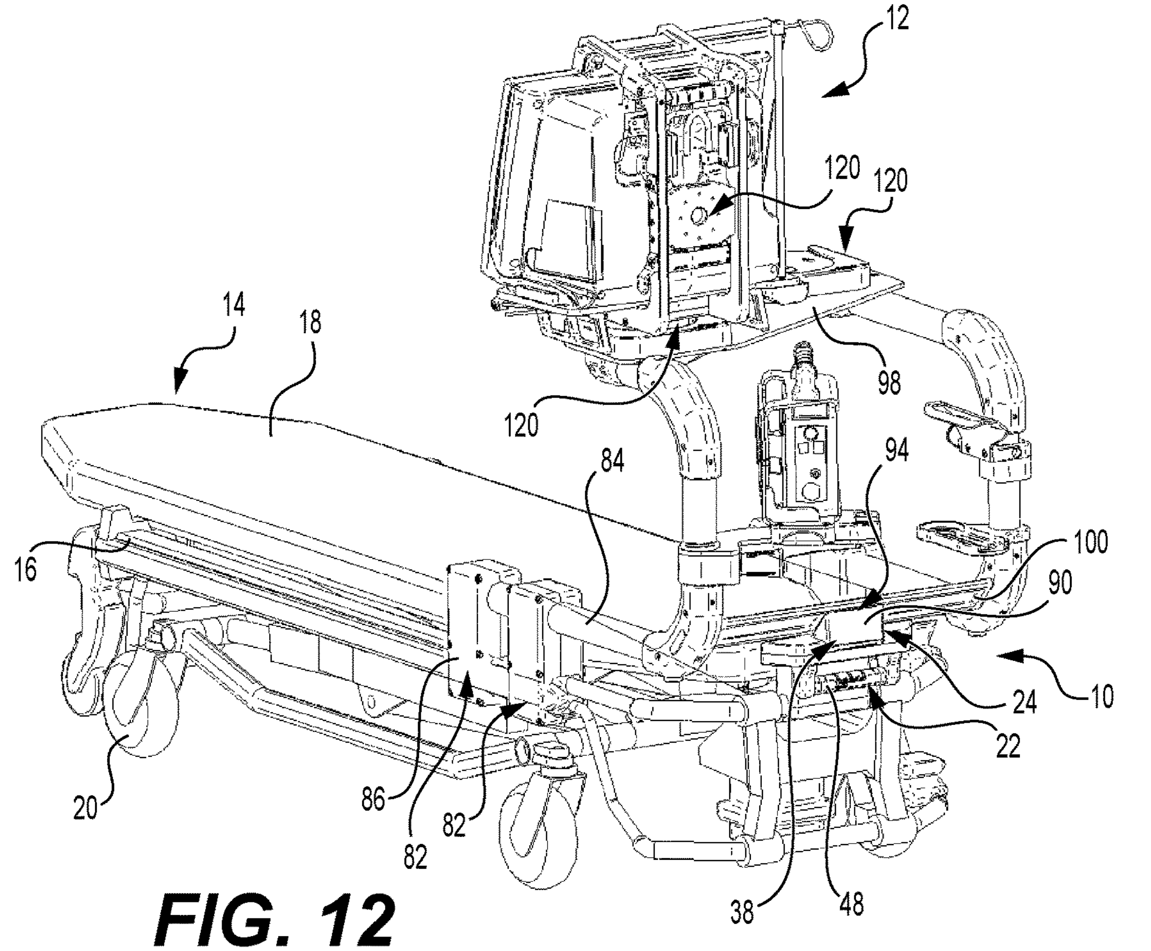
FIG. 12 is the patient transport system, base member and positioning member of FIG. 11, with equipment attached to an equipment frame of the positioning member using connecting devices, according to certain embodiments of the present disclosure.

The equipment 12 may be any suitable equipment such as medical equipment, which may or may not be mobile. The mobile equipment can be any type of equipment that accompanies a patient on the patient transport system 14, such as, but not limited to, ventilators, pumps, monitoring equipment, screen, drips, etc. By equipment 12 is also meant any structural support for the equipment, such as frames etc. FIG. 12 illustrates the use of the coupling system 10 to attach medical equipment 12 to a stretcher 14.

Turning now to FIGS. 1, 2A, 3A and 4A, the coupling system 10 according to an embodiment of the present technology comprises a base member 22 connectable to the patient transport system 14, and a positioning member 24 connectable to the equipment 12 (whether directly or indirectly). The positioning member 24 is arranged to be coupled to the base member 22 to attach the equipment 12 to the patient transport system 14, and to be decoupled from the base member 22 to detach the equipment 12 from the patient transport system 14. The coupling system 10 can be said to have two operation modes: a coupled mode when the positioning member 24 is coupled to the base member 22 and cannot be separated therefrom, and a release mode when the positioning member 24 is released from the base member 22 and can be separated therefrom. In certain embodiments, the base member 22 and the positioning member 24 are configured to be coupled and released in a convenient manner as will be described in further detail below.

The base member 22 comprises a recessed portion 26 having a base 28 and a wall 30, and a retractable stop member 32. The retractable stop member 32 is arranged to extend into the recessed portion 26, though an opening 34 in the base 28 (best seen in FIG. 2A), when in the coupled mode ("extended position" of the retractable stop member 32). In the release mode, the retractable stop member 32 is retracted through the opening 34 and does not extend into the recessed portion 26 ("retracted position" of the retractable stop member).

In the extended position, a channel 36 is defined in the recessed portion 26 by the retractable stop member 32 and the wall 30 of the recessed portion 26, the channel 36 being arranged to receive an end portion 38 of the positioning member 38 for engagement with the wall 30 of the recessed portion 26 and the retractable stop member 32. The recessed portion 26 has an open access end 40 through which the positioning member 24 can be slidingly inserted and removed from the recessed portion 26. The recessed portion 26 has a rectangular configuration, with the wall 30 extending along three of the four sides, and the open access end 40 being the one side without the wall 30 extending along it.

Figure 2A:
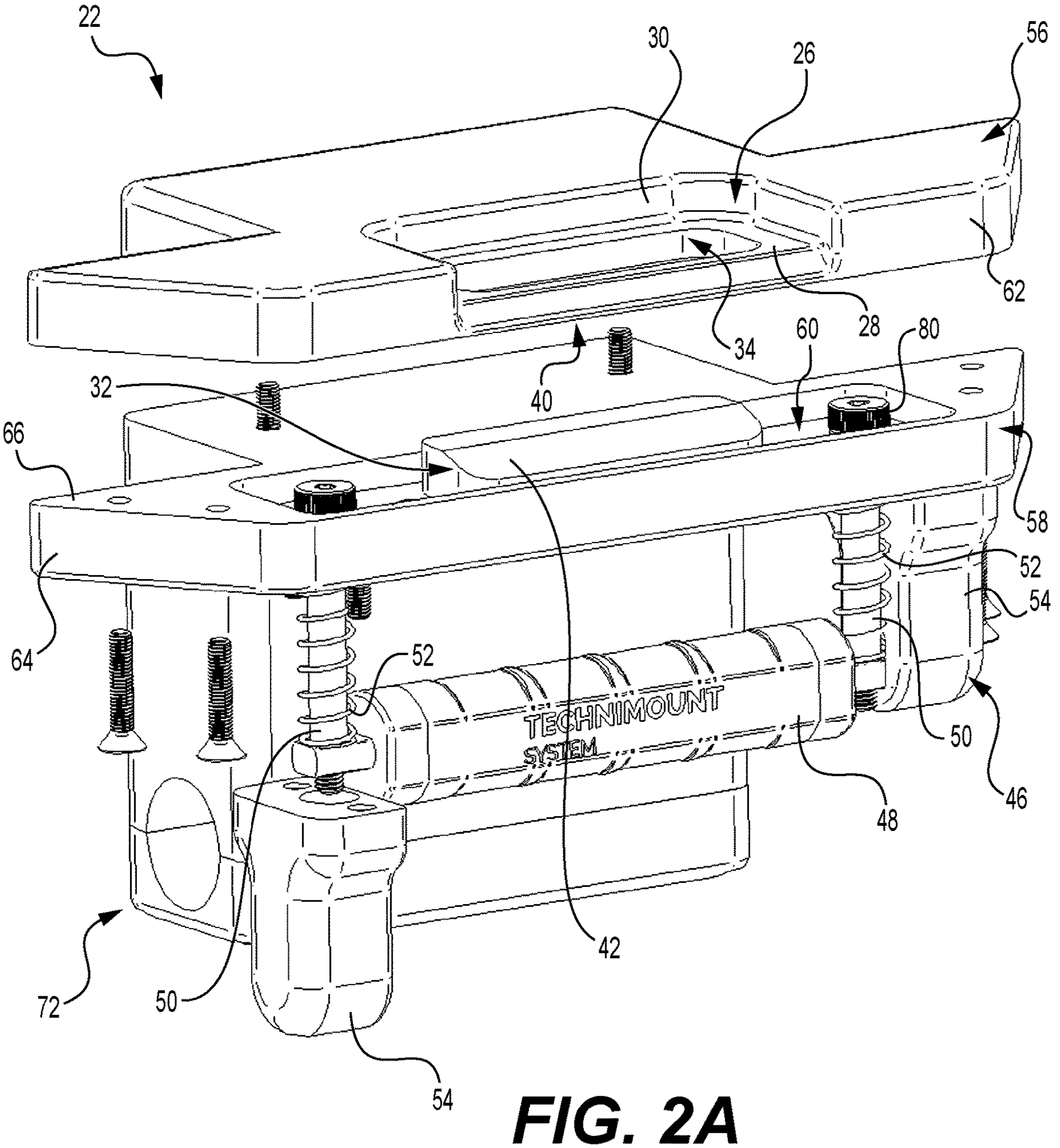
FIG. 2A is a perspective view from the top of the base member of FIG. 1 and including another portion in exploded view, and with a retractable stop member in an extended position; according to certain embodiments of the present disclosure.
Figure 3A:
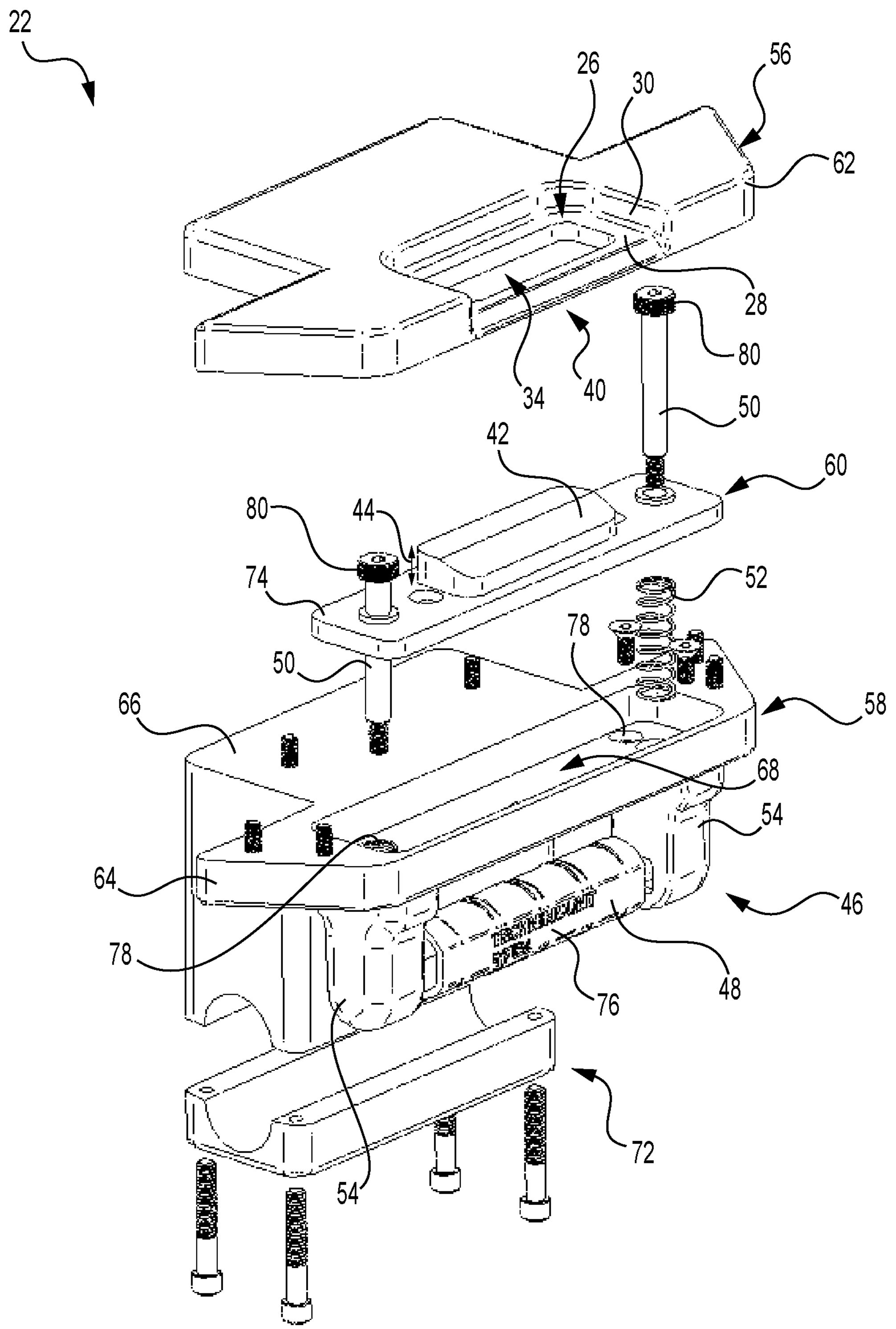
FIG. 3A is a perspective view from the top of the base member of FIG. 1 and including other portions in exploded view, according to certain embodiments of the present disclosure.
Figure 4A:
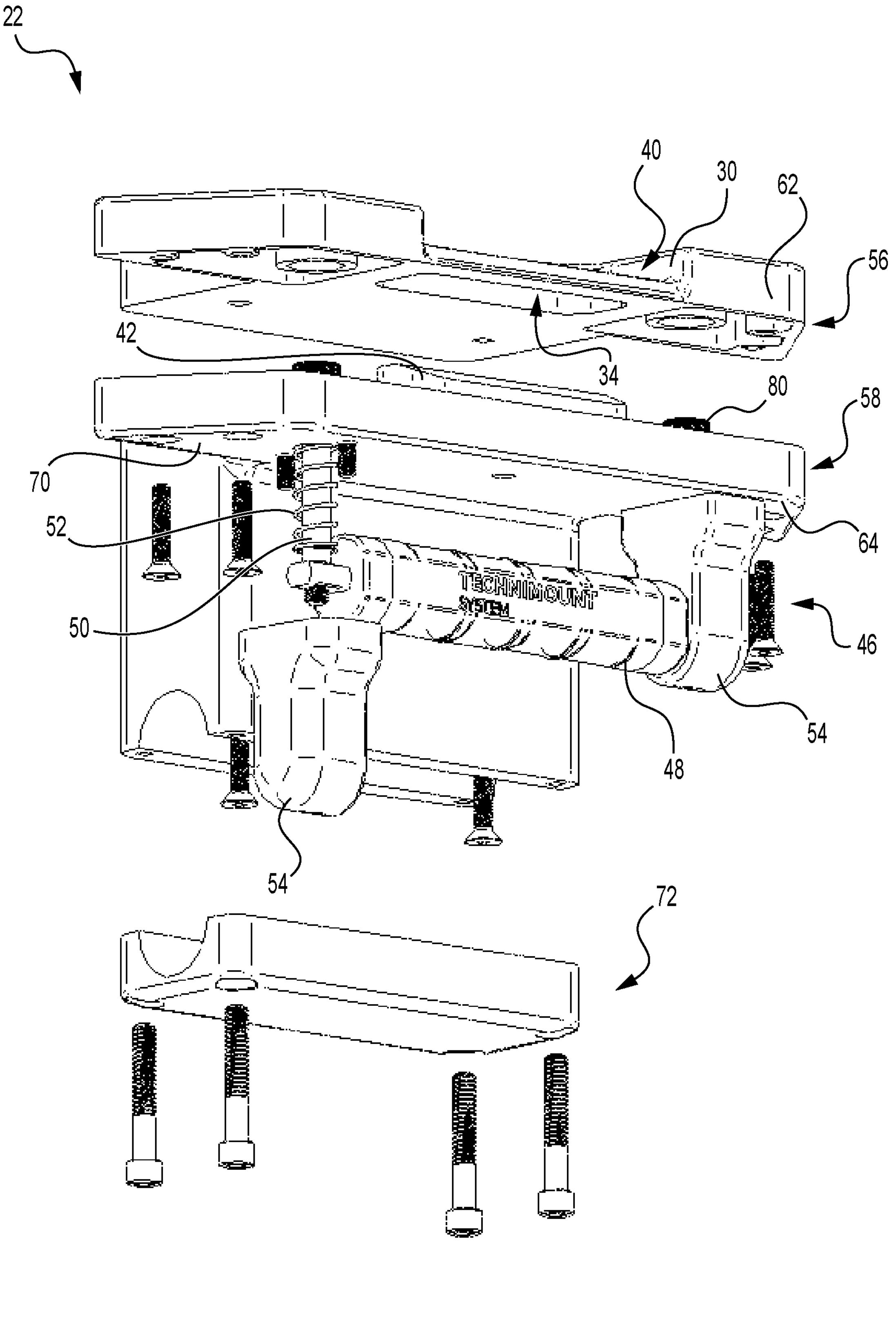
FIG. 4A is a perspective view from the bottom of the base member of FIG. 1 and including portions in exploded view, according to certain embodiments of the present disclosure.

The retractable stop member 32 has a profile 42 which is wedge-shaped, such that a height 44 of the retractable stop member 32 is decreased towards the open access end 40 of the recessed portion 26. As best seen in FIGS. 2A, 3A and 4A, the retractable stop member 32 has an actuation system 46 permitting actuation of the retractable stop member 32 between the retracted position and the extended position. The actuation system 46 comprises a resiliently biased actuator connected to the retractable stop member. More specifically, the resiliently biased actuator comprises a handle 48 connected to the retractable stop member 32 by at least one pin 50, and at least one resilient member 52, such as a spring extending along the pin 50, for resiliently biasing the handle 48 towards the retractable stop member 32, and for resiliently biasing the retractable stop member 32 in the extended position. A cover 54 may be provided for covering each spring 52 and pin 50 combination.

As best seen in FIGS. 2A, 3A and 4A, the base member 22 has a three part configuration: (i) an upper portion 56; (ii) a lower portion 58 connected to the upper portion 56, and (iii) a retractable stop member portion 60 moveably arranged between the upper portion 56 and the lower portion 58. In other embodiments, portions of the base member 22 may be one-piece.

The upper portion 56 comprises an upper body 62 having the recessed portion 26 defined therein and having the base 28 and the wall 30, and the opening 34 defined in the base 28 through which the retractable stop member 32 can extend and retract.

The lower portion 58 comprises a lower body 64 having an upper face 66, the upper face 66 being adapted to moveably house the retractable stop member portion 60. The upper face 66 has a recess 68 which is sized and shaped to receive the retractable stop member portion 60. In the illustrated embodiment, a lower face 70 of the lower body 64 is arranged to be connectable to the patient transport system 14 by a clamp 72. However, it will be appreciated that any part of the base member 22 can be adapted to be connectable to the patient transport system 14, either by the clamp 72 or by any other fastening member. the lower portion 58 may be attached to the upper portion 56 by any fastener, such as a screw. The clamp 72 may be attached to the lower body 64 by any fastener, such as a screw.

Figure 2B:
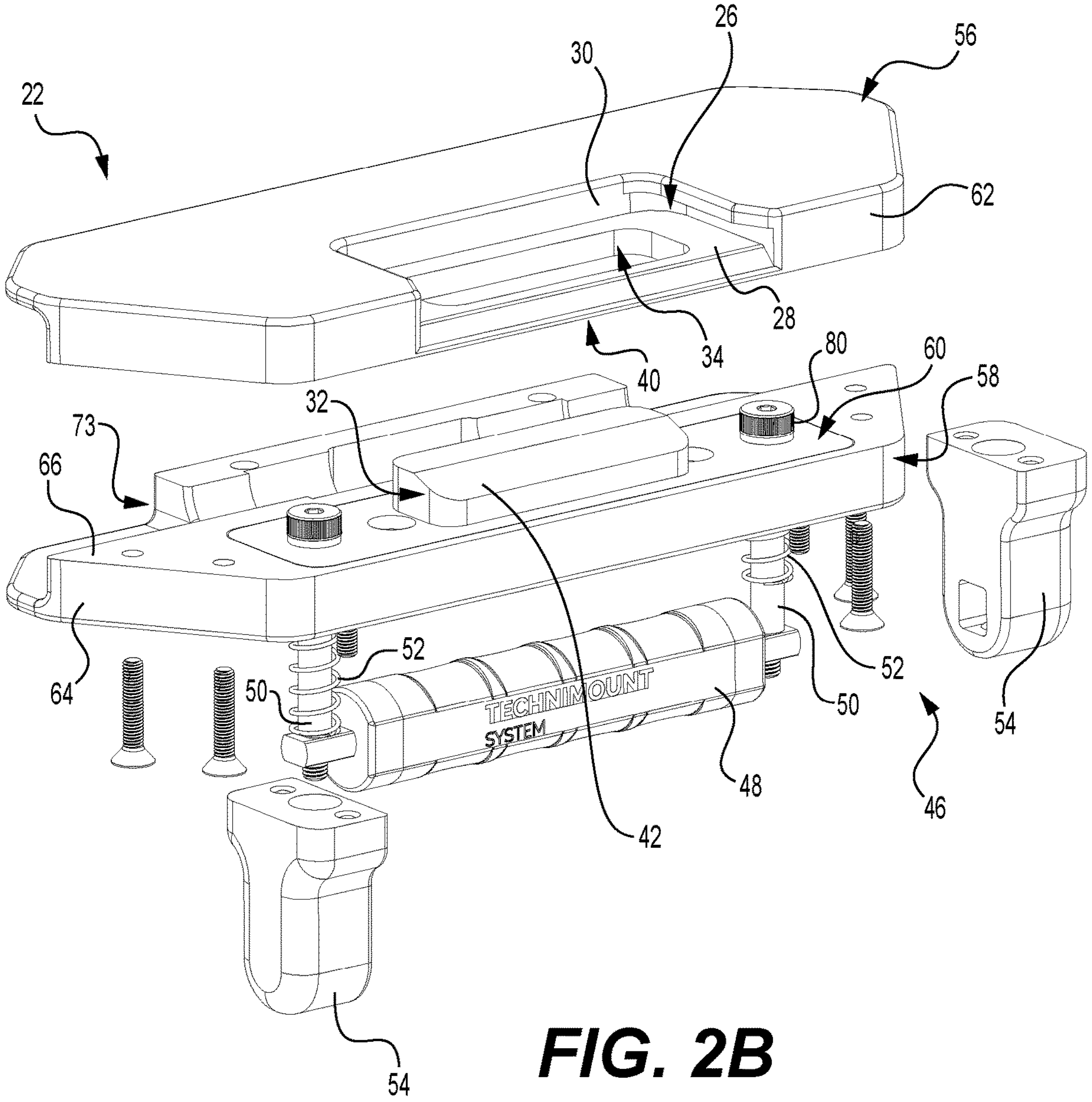
FIG. 2B is a perspective view from the top of an alternate embodiment of the base member of FIG. 1 and including a portion in exploded view, and with a retractable stop member in an extended position; according to certain embodiments of the present disclosure.
Figure 3B:
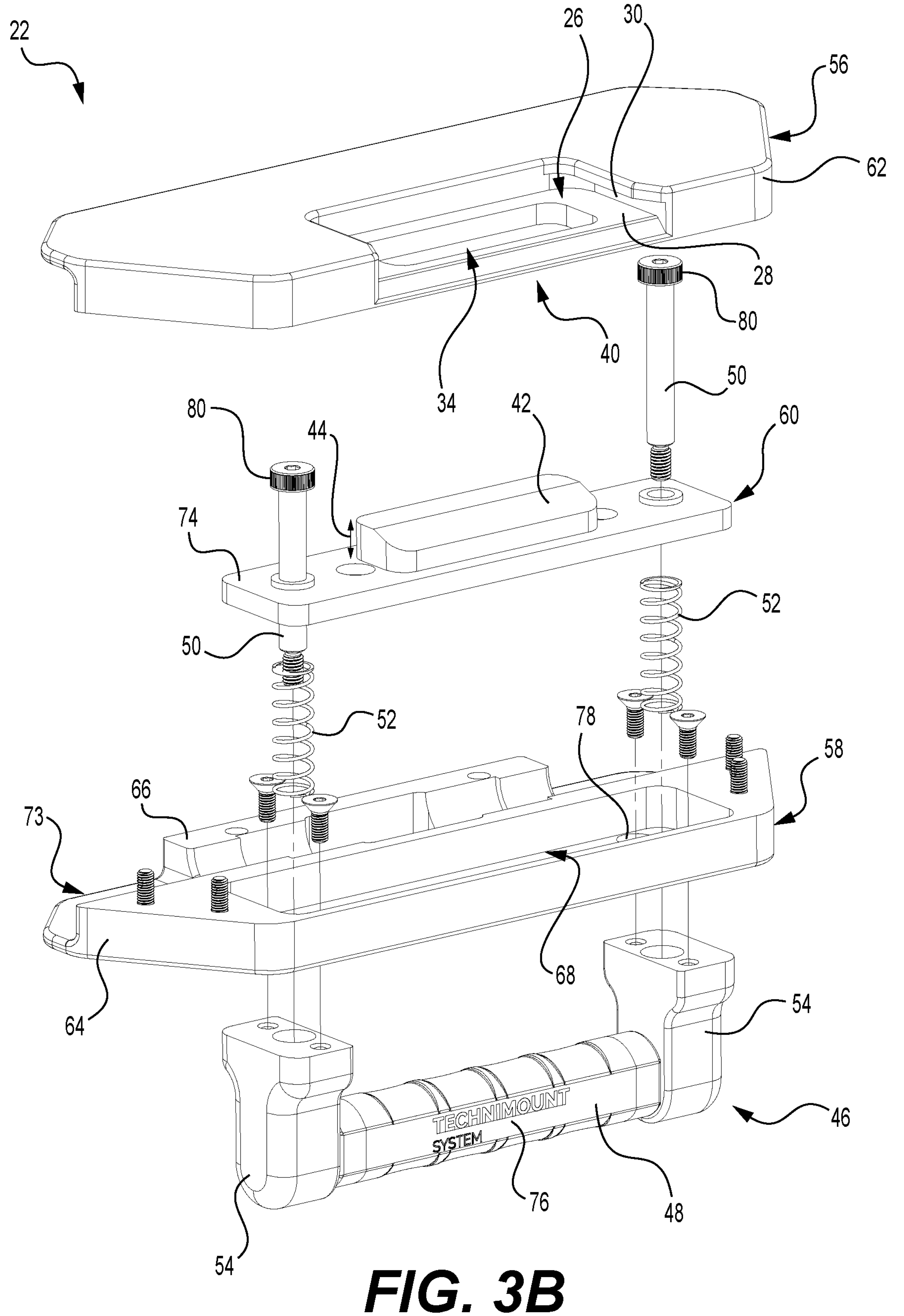
FIG. 3B is a perspective view from the top of the base member of FIG. 2B and including other portions in exploded view, according to certain embodiments of the present disclosure.
Figure 4B:
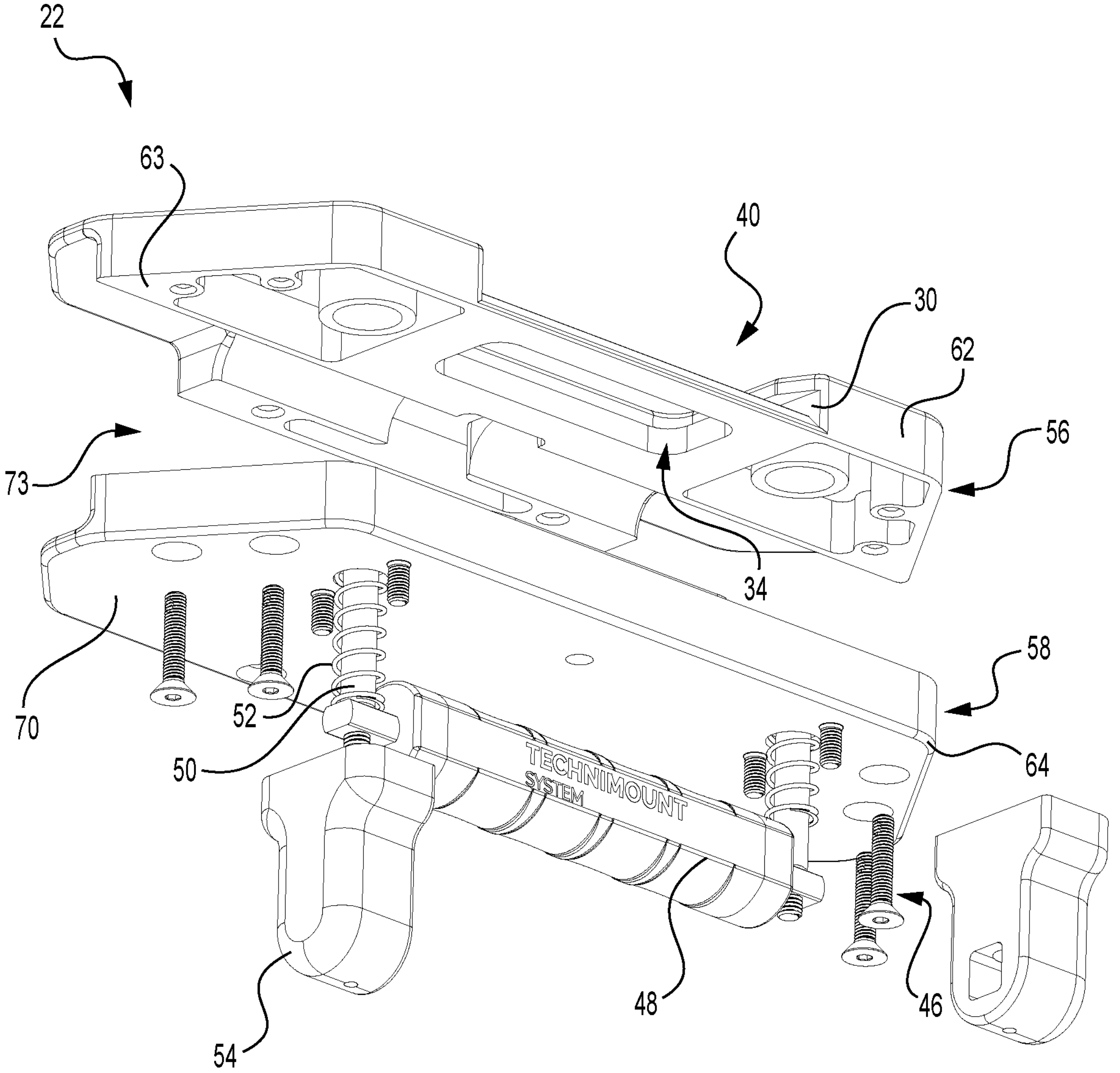
FIG. 4B is a perspective view from the bottom of the base member of FIG. 2B and including portions in exploded view, according to certain embodiments of the present disclosure.

In an alternative embodiment illustrated in FIGS. 2B, 3B, 4B, the base member 22 is connected to the patient transport system 14 through a clamp 73 formed by the upper face 66 of the lower body 64 and a lower face 63 of the upper body 62. The upper face 66 of the lower body 64 and a lower face 63 of the upper body 62 are oppositely facing and define a slot configured to receive, and enclose, a portion of the frame 16 when attached thereto by bringing the lower body 64 and the upper body 62 closer together. In other words, the base member 22 of FIGS. 2B, 3B, 4B differs from the base member 22 of FIGS. 2A, 3A, 4A in the manner in which it can be attached to the patient transport system. More specifically, instead of the clamp 72 associated with the lower body 64 only, the base member 22 of FIGS. 2B, 3B, 4B is provided with the clamp 73 associated with the upper and lower bodies 62, 64.

As such, embodiments of the base member 22 as illustrated in FIGS. 2A, 3A and 4A, as well as FIGS. 2B, 3B, 4B are separate and connectable to the frame 16 of the equipment 12. The base member 22 of FIGS. 2B, 3B, 4B as connected to the patient transport system 14 is illustrated in FIGS. 5A-C, 6 and 7.

In other embodiments (not shown), the base member 22 may be connected to the patient transport system 14 in any other manner. For example, the base member 22 could be connected to the patient transport system 14 with another type of clamp or clasp or with fasteners.

In other embodiments (not shown), at least a portion of the base member 22 may be integrally formed with the frame 16 of the patient transport system 14.

The retractable stop member portion 60 comprises a plate portion 74, sized and shaped to be received in the recess 68 of the upper face 66 of the lower body 64, and the retractable stop member 32 extending upwardly from the plate portion 74. The handle 48 may have a grip portion 76 which may be ergonomically shaped for a grip of a user's hand or fingers. The pins 50 extend through openings 78 in the recess 68 of the lower plate upper face 66 and are arranged to be slidingly moved up and down in the openings 78. A stopper 80 may be provided at an end of the pin 50 to ensure retention of the retractable stop member portion 60 with the pin 50. In this way, the retractable stop member 32 can be said to be moveably connected to the lower portion 58 with the pins 50 guiding the movement. The resilient members 52 are provided, one on each pin 50 and extending between the lower portion 58 and the handle 48 to resiliently bias the retractable stop member 32 away from the handle 48, and hence in the extended position, when the base member 22 is at steady state (i.e. no actuation on the handle 48). Pulling downwardly on the handle 48 in the release phase compresses the springs 52, and brings the retractable stop member 32 downwardly so that the retractable stop member 32 is retracted from the opening 34 of the of the base member 22. This causes the disengagement between the positioning member 24 and the retractable stop member 32 to allow them to be separated.

Figure 5A:
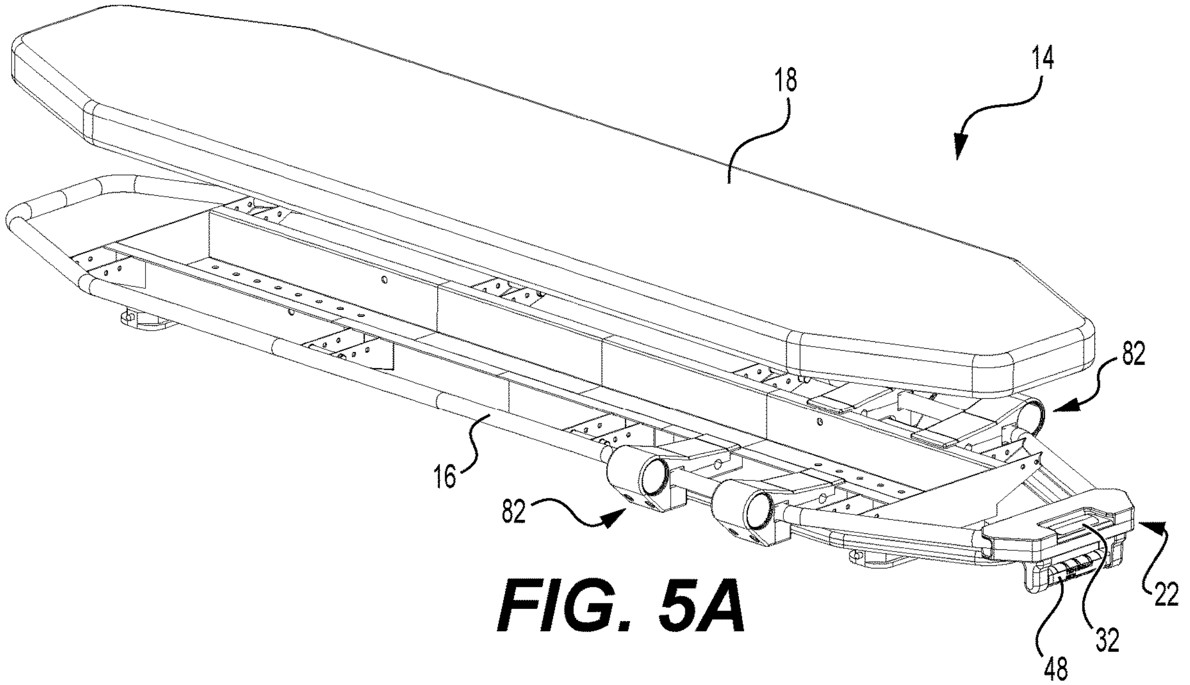
FIG. 5A is a perspective view from the top of a patient transport system and including the base member of FIGS. 2B, 3B and 4B, according to certain embodiments of the present disclosure.
Figure 5B:
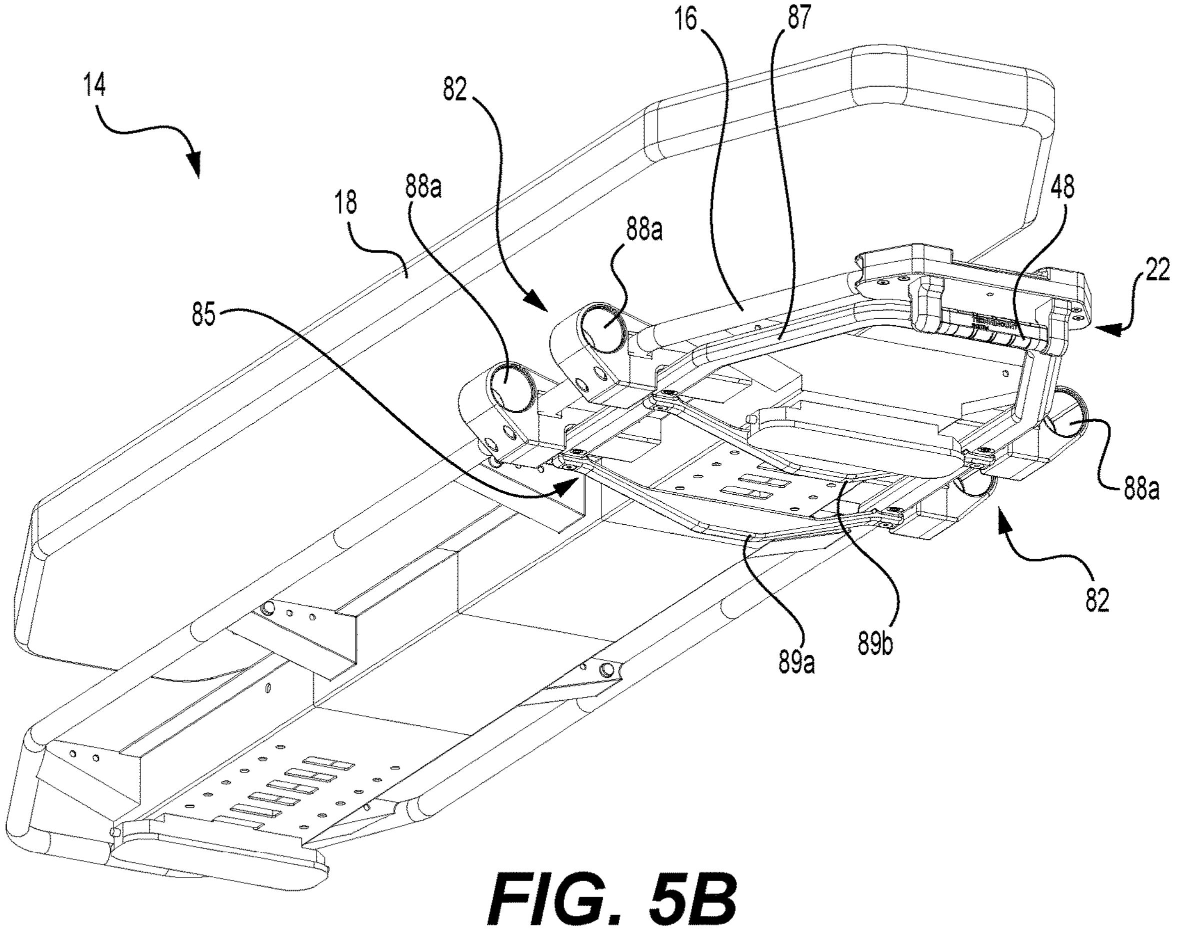
FIG. 5B is a perspective view from the bottom of the patient transport system of FIG. 5A, according to certain embodiments of the present disclosure.
Figure 5C:
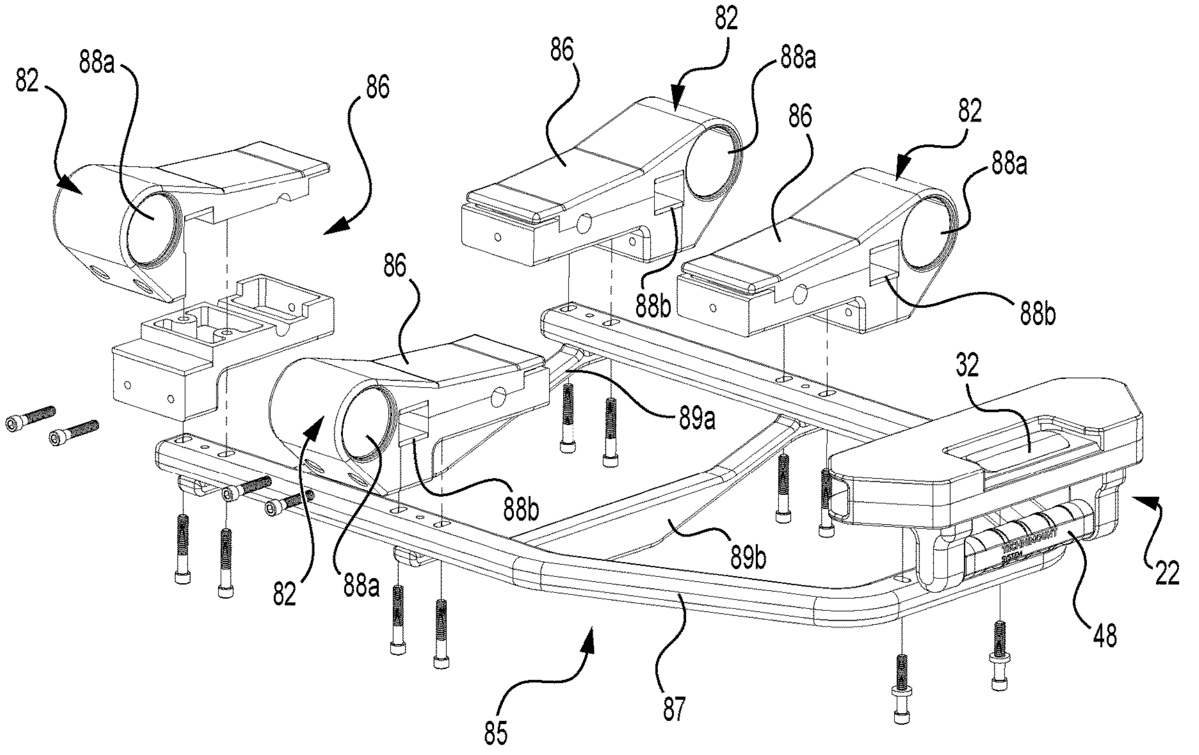
FIG. 5C is a perspective view from the top of a supporting rail assembly of the patient transport system of FIG. 5A, according to certain embodiments of the present disclosure.
Figure 6:
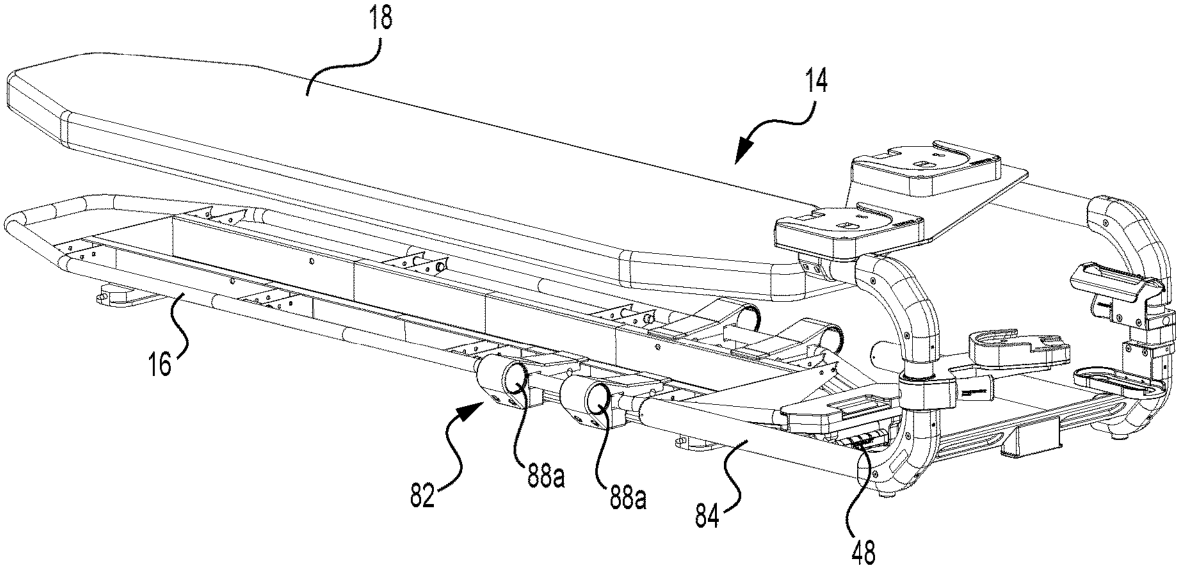
FIG. 6 is a perspective view of a patient transport system and including the base member of FIGS. 2B, 3B and 4B and a positioning member, according to certain embodiments of the present disclosure.
Figure 7:
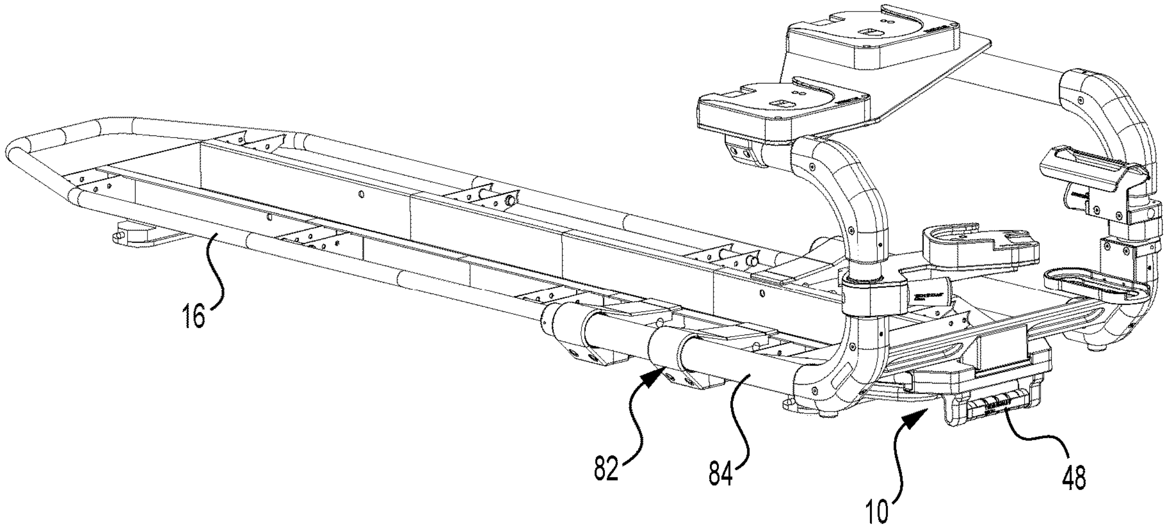
FIG. 7 is a perspective view of the patient transport system and including the base member of FIG. 6 with the positioning member attached thereto, according to certain embodiments of the present disclosure.
Figure 8:
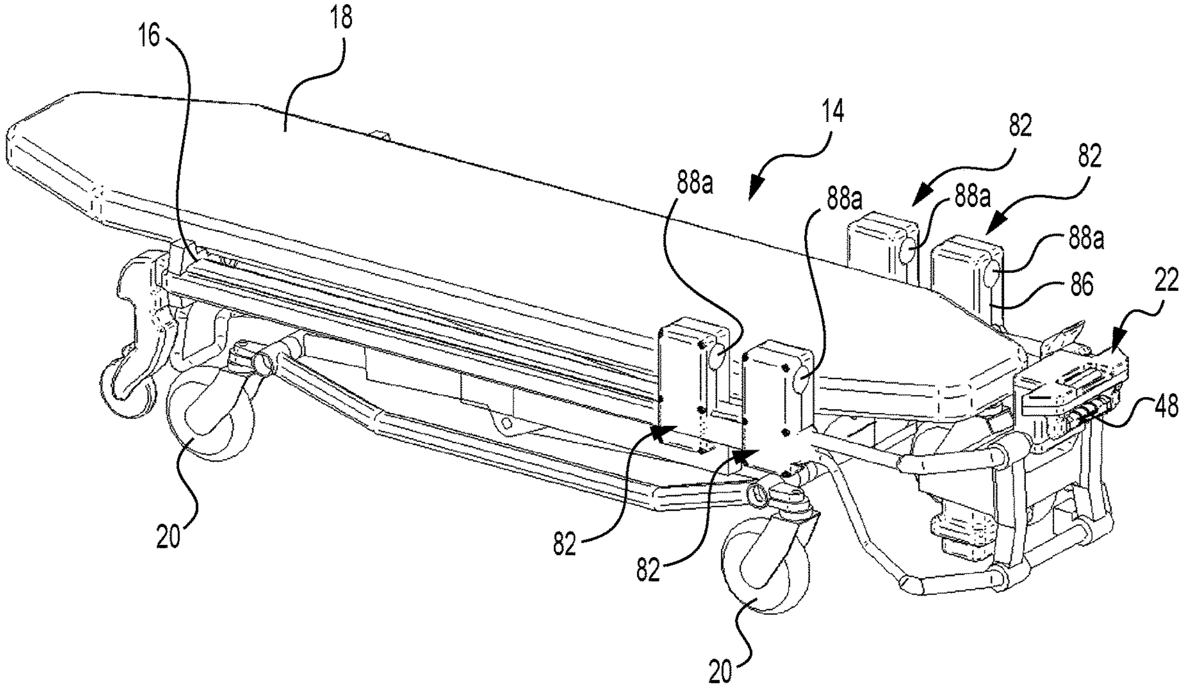
FIG. 8 is a perspective view of another embodiment of a patient transport system and including the base member of FIGS. 1, 2A, 3A and 4A, according to certain embodiments of the present disclosure.
Figure 9:
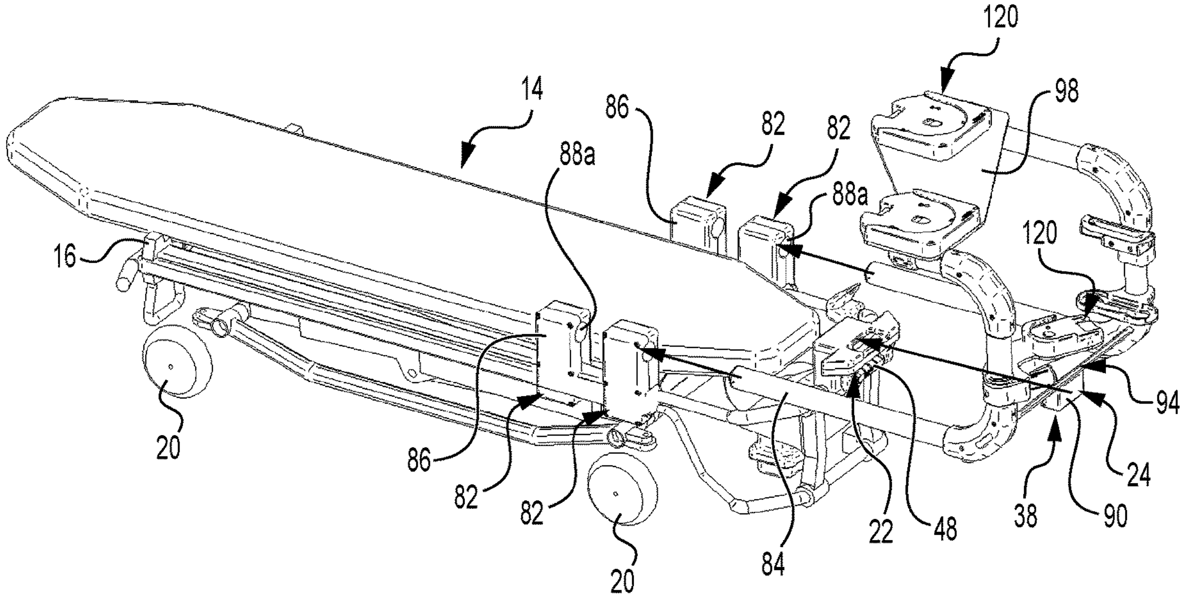
FIG. 9 is a perspective view of the patient transport system and including the base member of FIG. 8 and a positioning member, according to certain embodiments of the present disclosure.
Figure 10:
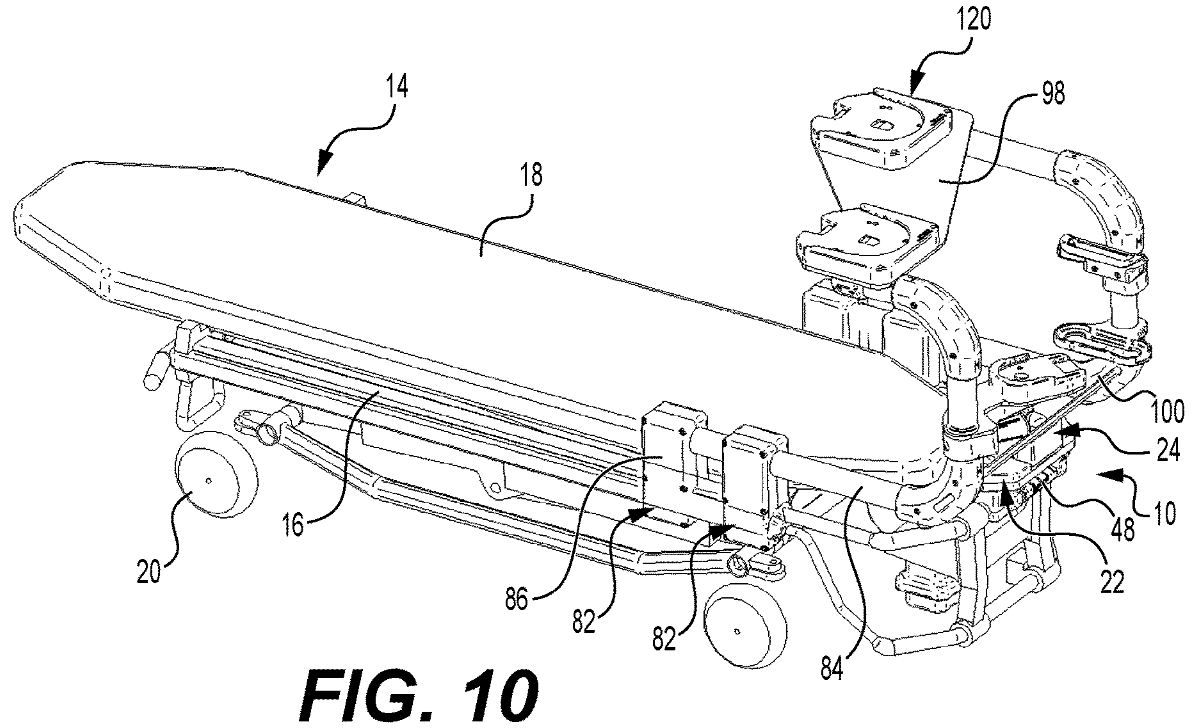
FIG. 10 is a perspective view of the patient transport system and including the base member of FIG. 9 with the positioning member attached thereto, according to certain embodiments of the present disclosure.
Figure 11:
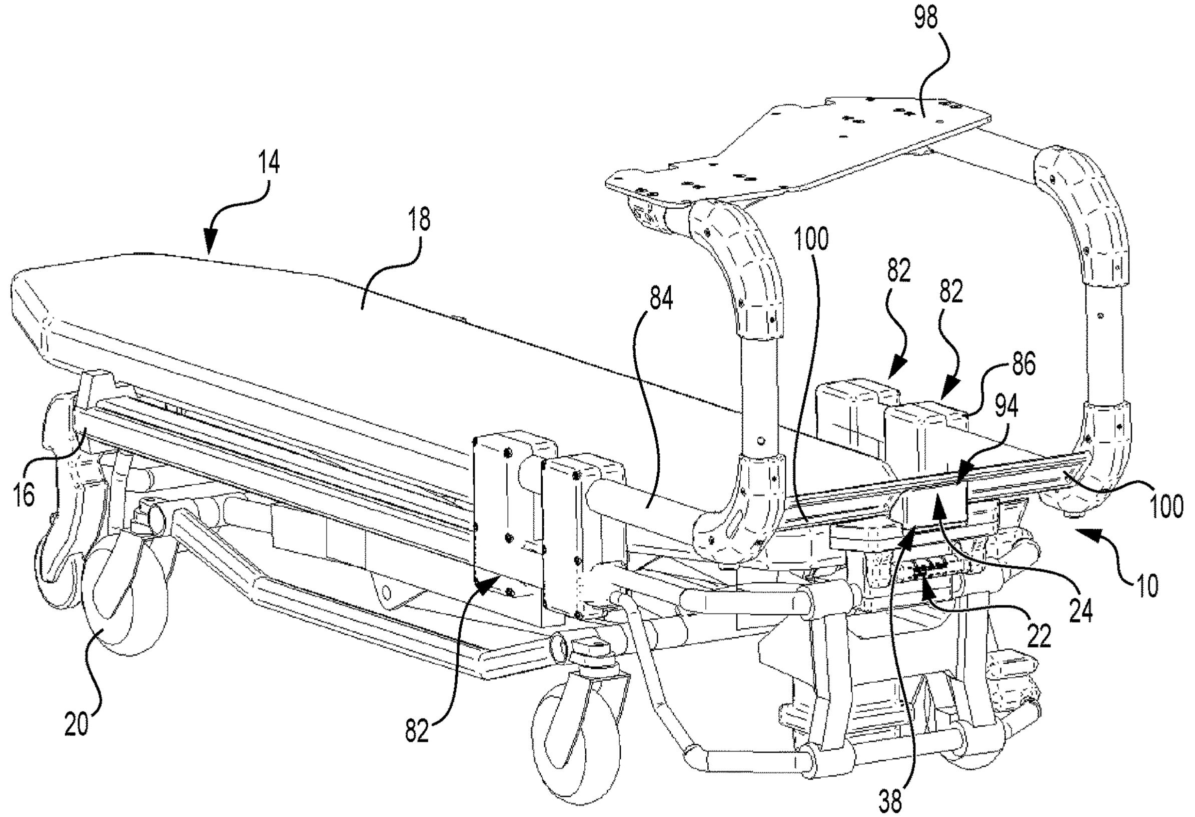
FIG. 11 is a perspective view of the patient transport system and base member of FIG. 9 with another embodiment of the positioning member attached thereto, according to certain embodiments of the present disclosure.

In certain embodiments, guide members 82 are provided which are integral with, or formed separately and attachable to, the patient transport system 14 (shown in FIGS. 5A-C, 6-13). The guide members 82 are arranged to receive arms 84 of an equipment frame 96 attached to the positioning member 24. In certain embodiments, two guide members 82 are configured to receive the same arm 84. Each guide member 82 comprises a guide member body 86 defining an arm opening 88*a* for receiving the arm 84. As best seen in the figures, the arm opening 88*a* has a circular profile for receiving circular cross-sectional arms 84, in the embodiments illustrated herein. Other profiles of arms 84 and arm openings 88*a* of the guide member 82 are also possible but not shown. The guide member body 86 also defines a frame opening 88*b* for receiving the frame 16. As best seen in FIG. 5C, the guide member body 86 has a two-part configuration. The arm opening 88*a* is formed within one of the two parts whilst the frame opening 88*b* is formed between the two parts such that the frame 16 can be retained in the frame opening 88*b* by a clamping of the two parts together. The guide members 82 can be considered as a connector of the frame 16 and the positioning member 24. In the embodiments illustrated herein, two pairs of guide members 82 are provided, one pair per elongate side of the stretcher 14, with the base member 22 being positioned between the two pairs of guide members 82. Each pair of arm openings 88*a* of the guide members along a respective elongate side of the stretcher are axially aligned so as to guide and hold in position the respective arm 84. It will be appreciated that it is within the scope of the present technology to provide other numbers of guide members 82 or other configurations of the guide member 82.

Figure 13:
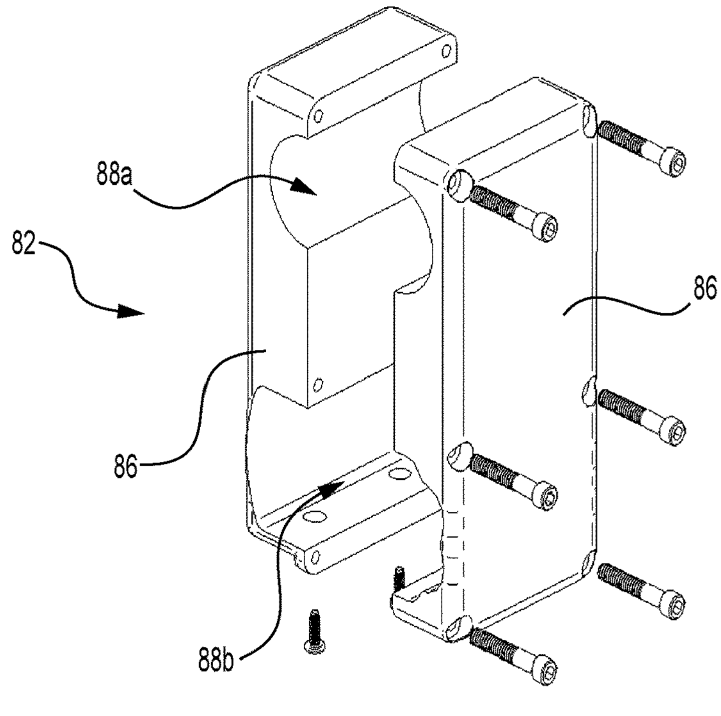
FIG. 13 is a clamp for attaching the equipment frame of a positioning member to the patient transportation system, according to certain embodiments of the present disclosure.
Figure 14:
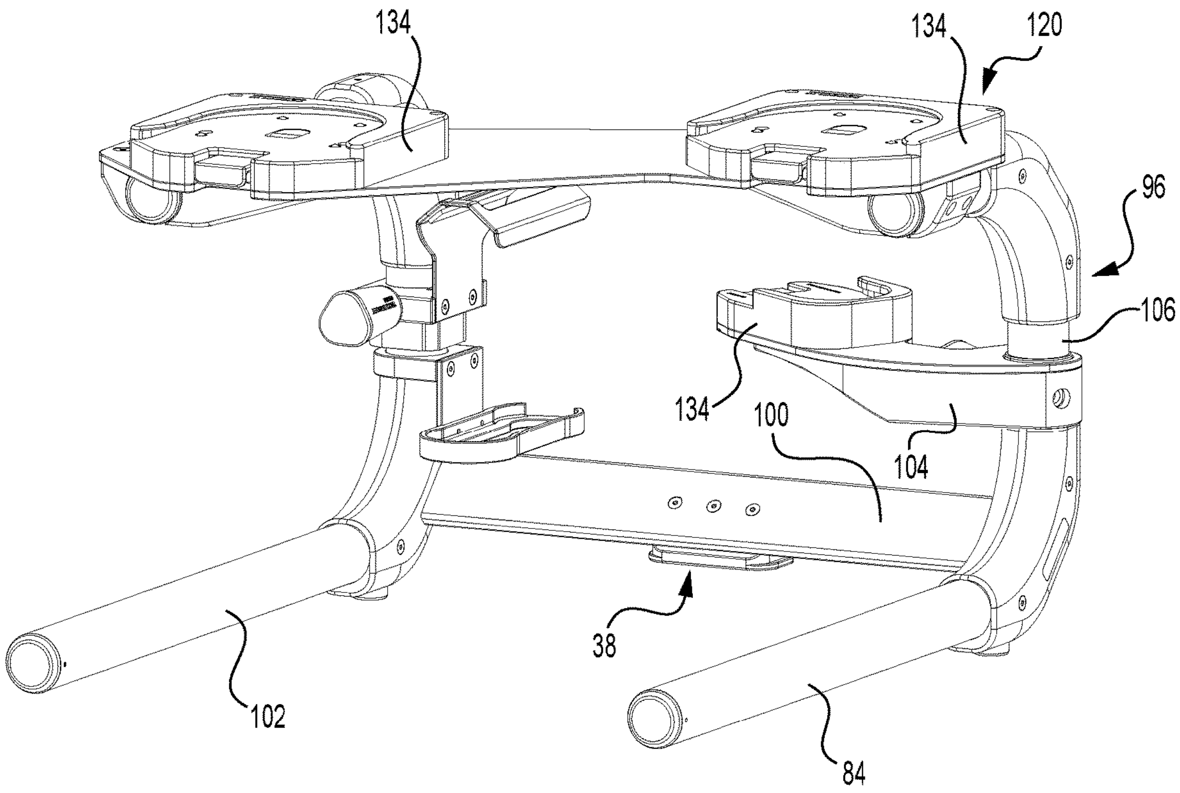
FIG. 14 is an equipment frame comprising a positioning member of the coupling system, and a base member of a connecting device attached thereto, according to certain embodiments of the present disclosure.
Figure 15:
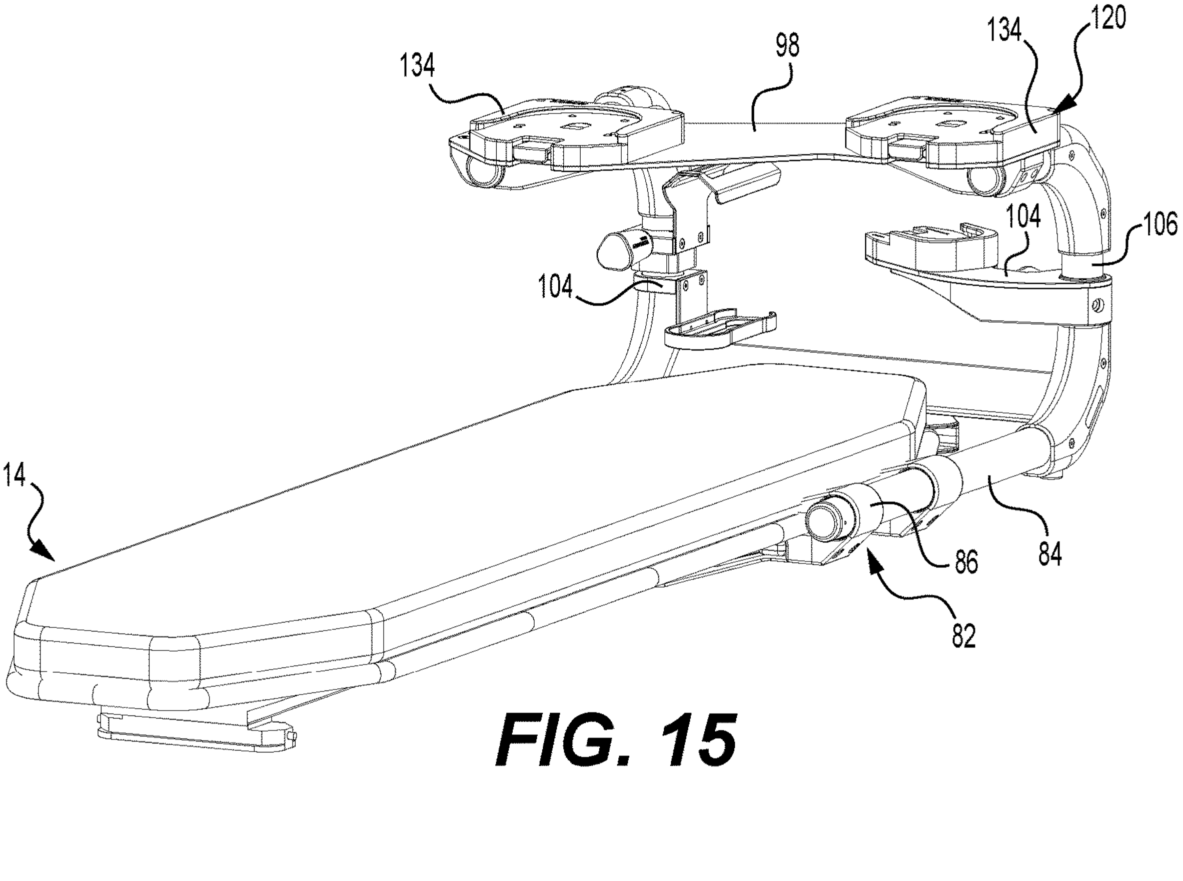
FIG. 15 is the equipment frame of FIG. 14 attached to a stretcher, according to certain embodiments of the present disclosure.

The embodiment of the guide member 82 of FIG. 13 differs from that of FIGS. 5A-C in that the arm opening 88*a* is positioned above the frame opening 88*b*. Both the arm opening 88*a* and the frame opening 88*b* are formed between the two parts so as to retain both the arm 84 and the frame 16 by clamping the two parts together.

Such a two-part configuration of the guide member 82 defining the frame opening 88*b* allows for clamping around the frame 16 of the patient transport system 14 for a retroactive attachment of the coupling system 10 to the patient transport system 14.

In the embodiments illustrated in FIGS. 5A-C, there is also provided a supporting rail assembly 85 connectable to the guide members 82. The supporting rail assembly 85 includes a support rail 87 and two support cross members 89*a*, 89*b*. When connected, the support rail 87 is disposed below the frame 16, extends along a portion of the frame 16, and generally follows the shape thereof. A front portion of the support rail 87 may engage with the base member 22. The two support cross members 89*a*, 89*b* are longitudinally spaced from one another, and are fastened to lateral sides of the support rail 87. It is contemplated that in other embodiments, the two support cross members 89*a*, 89*b* and the guide rail 87 may be connected in a different manner than as described and illustrated herein. It is also contemplated that the two support cross members 89*a*, 89*b* and the guide rail 87 may be integral. In other embodiments, there may be more or less than two support cross members 89*a*, 89*b*. The supporting rail assembly 85 may provide additional stability to the coupling system 10 but is an optional feature. For clarity, in other embodiments, the supporting rail assembly 85 may be omitted.

Turning now to the positioning member 24, best seen in FIGS. 6, 7, 9, 11, 12 and 14 and 15. The positioning member 24 comprises a positioning member body 92 having the end portion 38 adapted to be received in the channel 36 of the base member 22. The end portion 38 has a rectangular configuration which is sized and shaped to be received in the recessed portion 26. The positioning member 24 is hollow and walls of the positioning member 24 are sized and shaped to be received in the channel 36. In other words, the walls of the positioning member 24 define a cavity, and when the positioning member 24 is placed on the base member 22, the retractable stop member 32 extends into the cavity. The positioning member body 92 has a connection end 94, arranged to be connectable to the equipment 12. The connection end 94 is connected to the equipment frame 96 to which are connectable one or more pieces of equipment 12 using for example one or more connecting devices 120, which will be described later with reference to FIGS. 16-26. A platform 98 may be provided attached to the equipment frame 96 for supporting the connecting device, or a portion of the connecting device 120. Multiple platforms may be provided.

The equipment frame 96 comprises a cross-bar 100 to which the positioning member 24 is attached, and the two arms 84 extending transversely, and substantially parallel to one another, from each end of the cross-bar 100. The arms 84 are arranged to be received in the openings 88 defined in each guide member body 86.

The equipment frame 96 may further comprise, in certain embodiments, at least one structural unit 104 for supporting one or more connecting devices, or at least some portions of the connecting devices. In the embodiment illustrated in FIG. 14, the structural support unit 104 comprises vertical support arms 106 for supporting medical equipment at different positions and heights to one another. The structural support unit 104 may also include a platform 98.

In use, equipment 12 can be secured to the patient transport system 14 by sliding the end portion 38 of the positioning member 24 through the open access end 40 of the recessed portion 26. Due to the wedge shape of the retractable stop member 32 and the moveable connection of the retractable stop member 32 to the upper portion 56 of the base member 22, the retractable stop member 32 is caused to move downwardly, to the retracted position, allowing the end portion 38 to be fully housed in the recessed portion 26. Due to the resilient bias of the retractable stop member 32 to the extended portion, as soon as the end portion 38 of the positioning member 24 is fully received in the recessed portion 26, the retractable stop member 32 moves upwardly to engage with the end portion 38 of the positioning member 24 and lock it into place. Engagement of the retractable stop member 32 with the end portion 38 of the positioning member 24 prevents movement of the positioning member 24 outwardly (horizontal separation) through the open access end 40 of the base member 22. In certain embodiments, a notch (not shown) may be provided to prevent vertical separation between the base member 22 and the positioning member 24.

The positioning member 24 can be decoupled from the base member 22 by pulling the handle 48 to overcome the resilient bias and to move the retractable stop member 32 downwardly and into the retracted position where it can no longer engage with the end portion 38 of the positioning member 24.

Turning now to the connecting device 120, best shown in FIGS. 16-26, which is configured to detachably attach equipment thereto. It will be appreciated that the connecting device 120 may be used to releasably connect any two items or elements together, such as a first item and a second item. The first and second items may comprise one or more of a support surface, a transportation device such as a wheelchair, a stretcher or a bed, equipment such as medical equipment, securing apparatus for equipment such as the securing apparatus 10.

The connecting device 120 comprises a base member 134 connectable to a portion of the frame 16, and a release member 136 connectable to the equipment 12. The base member 134 and the release member 136 are releasably connectable.

The release member 136 has a body 138 which may be plate-like and has a first side 140 and a second side 142. The first side 140 of the release member body 138 defines a planar contact face 144 for contacting the base member 134. The second side 142 of the release member 136 has a collar 146 extending therefrom, the collar 146 positioned inwardly of a perimeter 148 of the release member 136 to define a flange portion 150 of the release member 136.

The base member 134 has a front side 152 and a back side 154. The front side 152 has a planar contact portion 156 for contacting the contact face 144 of the release member 136. A shoulder 158 extends around a portion of a periphery 160 of the planar contact portion 156 to define a pocket 162 for receiving at least a portion of the release member 136. The shoulder 158 is engageable with a portion of the flange 150 of the release member 36 when the release member 136 is positioned on the base member 134.

The base member front side 152 has an open access end 164 through which the release member 136 can be slidingly inserted and removed from the pocket 162. As can be seen, the base member 134 is four-sided, with the shoulder 158 extending around three of the four sides and the fourth side being the open access end 164. In other embodiments, the base member 134 may have different numbers of sides.

Figure 18:
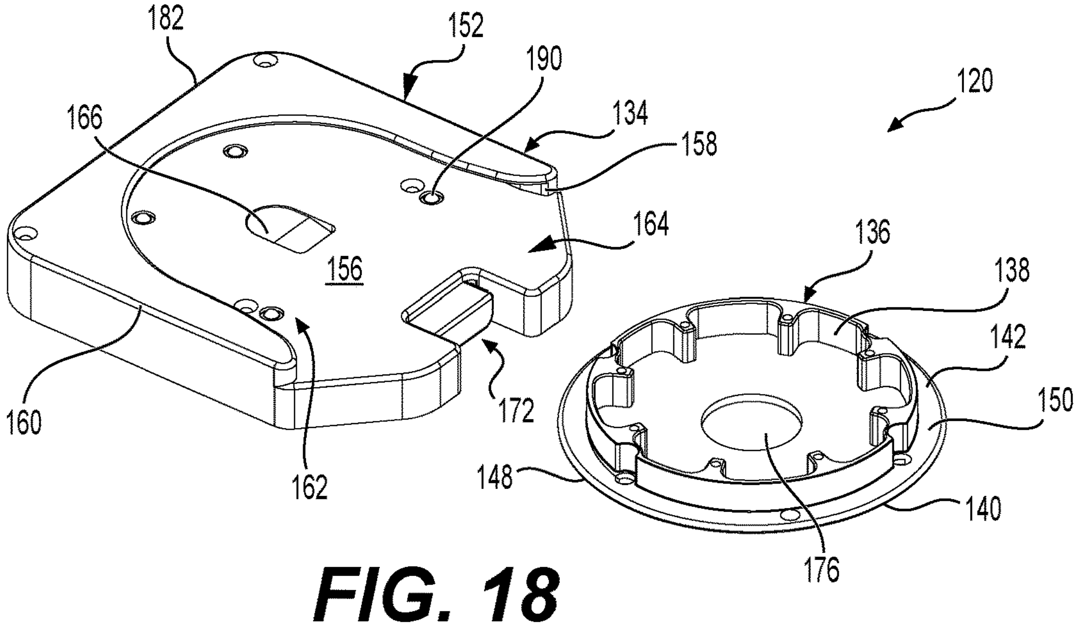
FIG. 18 is the connecting device of FIG. 16, when in the uncoupled and unlock position, according to certain other embodiments of the present disclosure.
Figure 19:
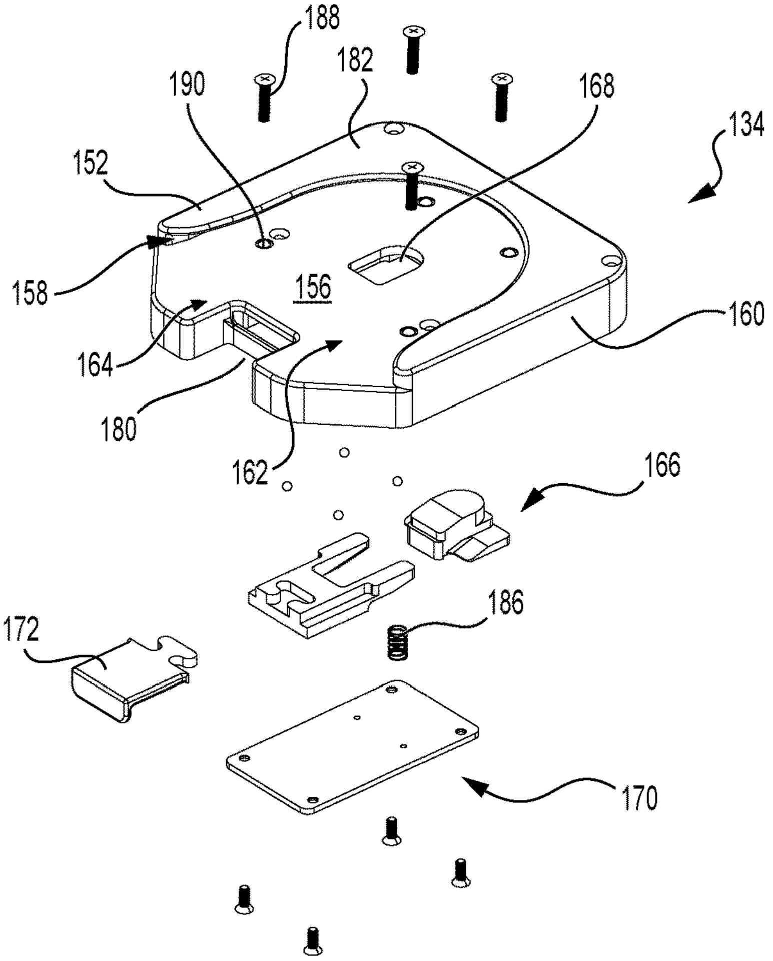
FIG. 19 is an exploded view of the base member of FIG. 16, according to certain other embodiments of the present disclosure.
Figure 20:
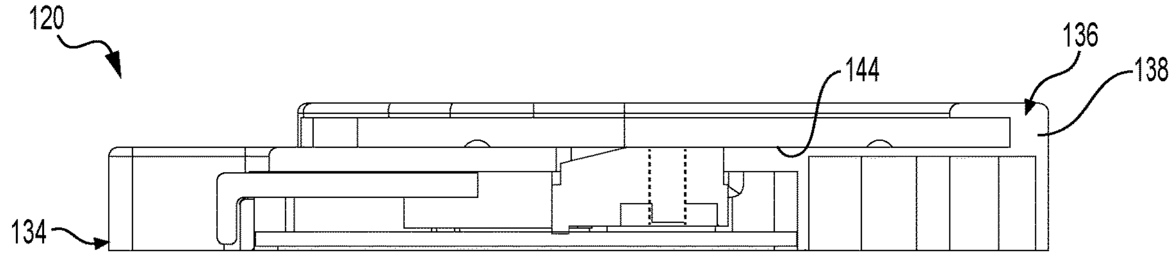
FIG. 20 is a cross-sectional view of the connecting device of FIG. 16, according to certain other embodiments of the present disclosure.

A stop member 166 is positioned in a recess 168 within the planar contact portion 156 of the base member 134 and is moveable relative to the planar contact portion 156. The stop member 166 is moveable to extend out of the recess 168 and to be housed fully in the recess 168 by a coupling lock mechanism 170 and an actuator 172. The stop member 166 is actuatable between a lock position in which at least a portion of the stop member 166 extends from the recess 168 and a release position in which the stop member 166 is retracted into the recess 168 and does not extend from the recess 168. In the lock position, when the base member 134 and the release member 136 are coupled together, the stop member 166 can abut an edge 174 of an opening 176 defined in the release member contact face 144 to delimit movement of the release member 36 towards the open access end 64 (FIGS. 18-20). In the release position, the release member 136 can be decoupled from the base member 134 (FIG. 20).

Figure 16:
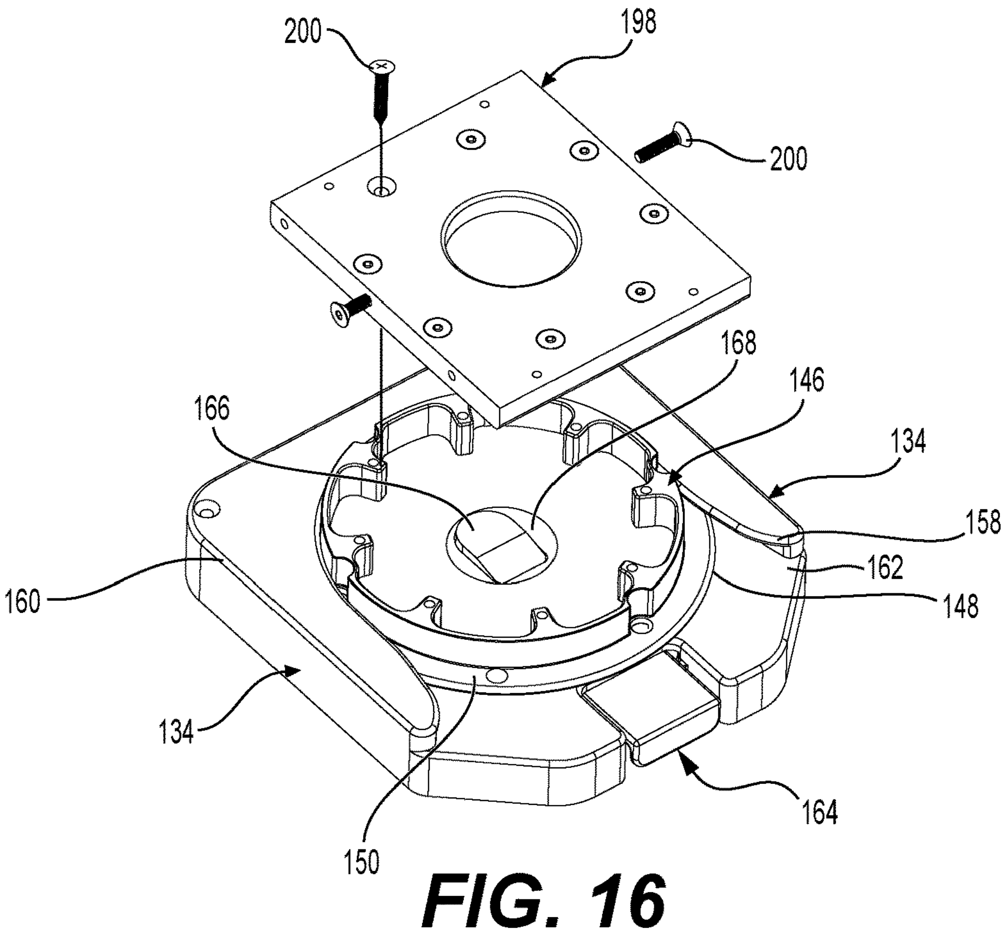
FIG. 16 is a connecting device comprising a base member, a release member, and a top plate, according to certain embodiments of the present disclosure.
Figure 17:
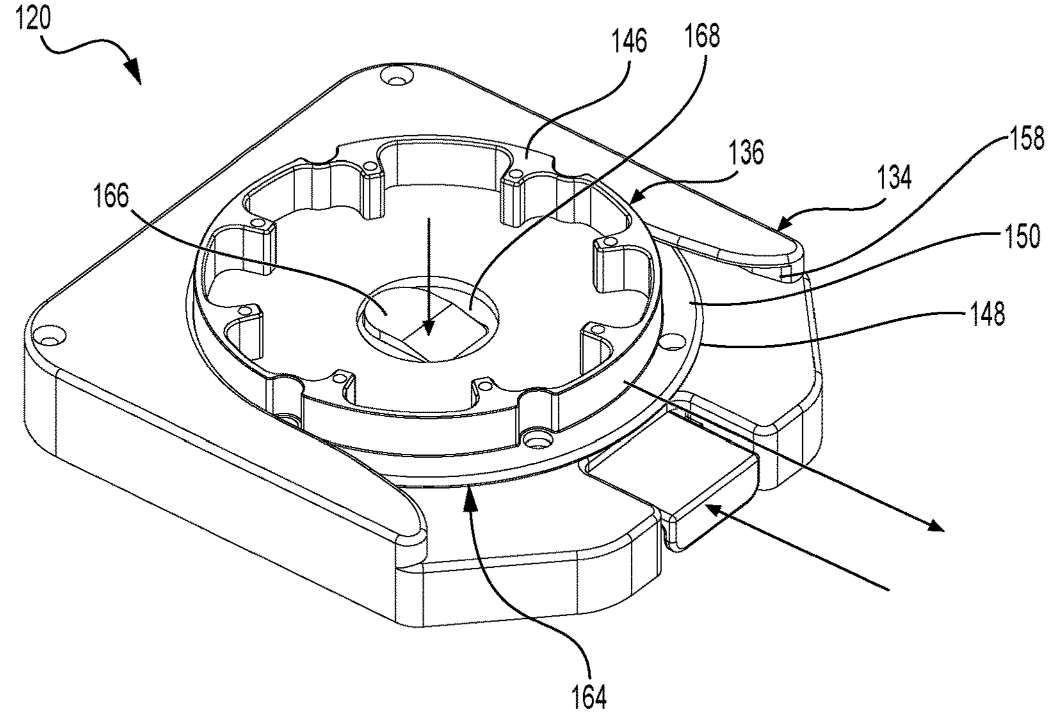
FIG. 17 is the connecting device of FIG. 16, with the top plate removed for clarity, when in the coupled and lock position, according to certain other embodiments of the present disclosure.

The actuator 172 is positioned at the open access end 164. The actuator 172 is a push button 178 housed within a groove 180 formed at the open access end 164. The actuator 172 can be moved between a neutral position and a deployed position. When the actuator 172 is in the neutral position (FIG. 17), the stop member 166 is resiliently biased towards the lock position. As best seen in FIG. 18, when the actuator 172 is in the deployed position (pushed inwardly), the coupling lock mechanism 170 is arranged to move the stop member 166 to retract into the recess 168 in the release position. This can allow the release member 136 to be slid relative to the base member 134 and removed from the base member 134. In certain embodiments, the actuator 172 extends beyond a perimeter 182 of the base member 134 (FIG. 26) when in the neutral position. In other embodiments, the actuator 172 does not extend beyond the perimeter 182 of the base member 134 (FIGS. 16-18).

Figure 22:
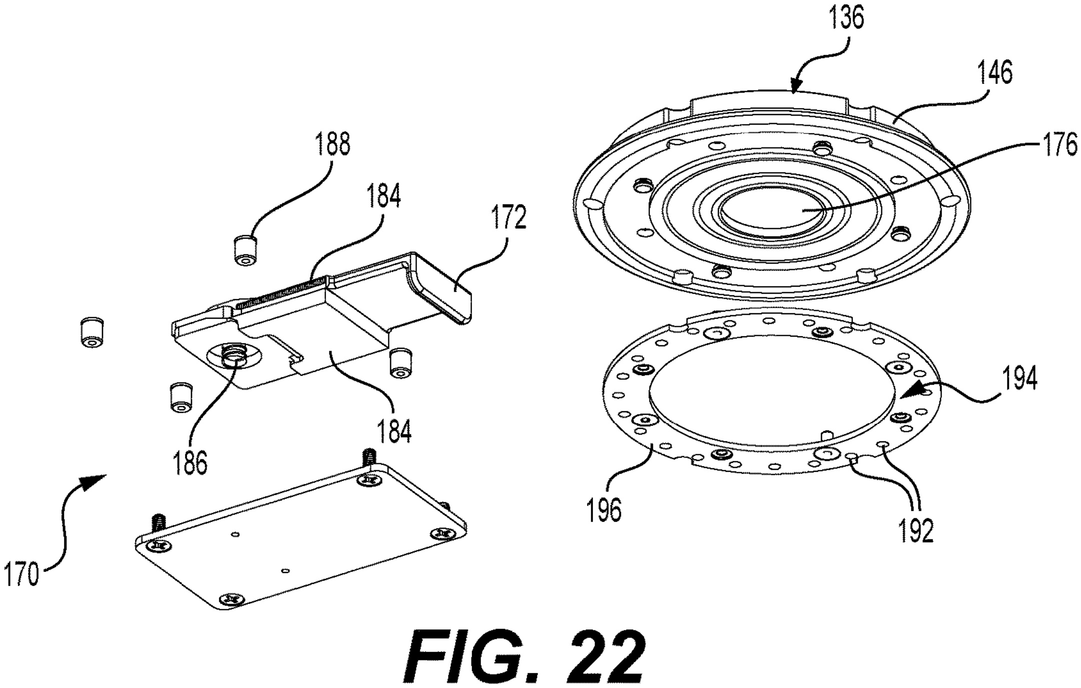
FIG. 22 is an exploded view of the release member of FIG. 16 and a lock mechanism, according to certain other embodiments of the present disclosure.
Figure 23:
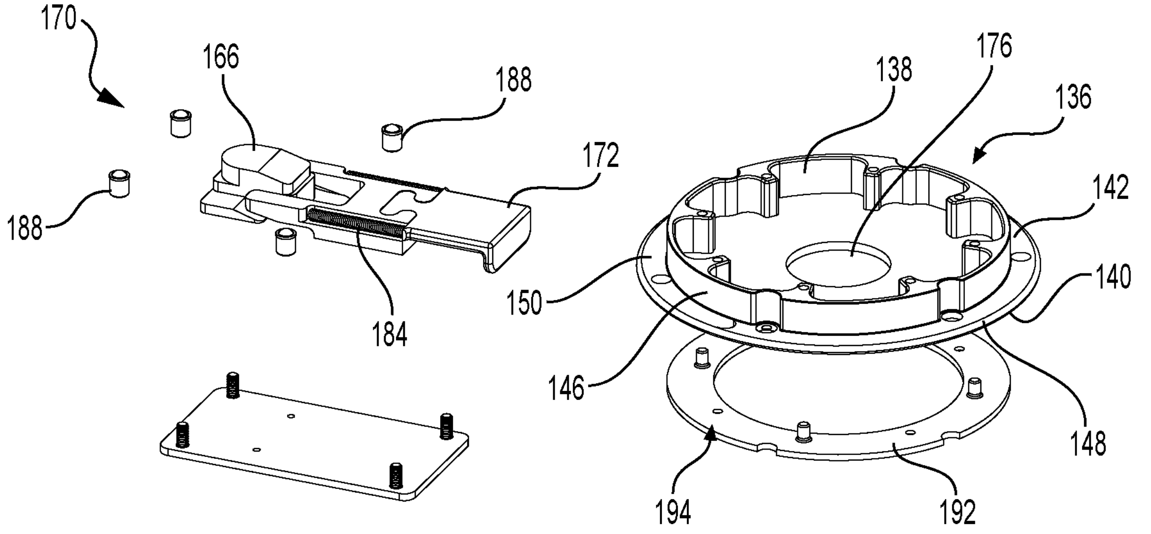
FIG. 23 is an exploded view of the release member of FIG. 16 and a lock mechanism, according to certain other embodiments of the present disclosure.
Figure 24:
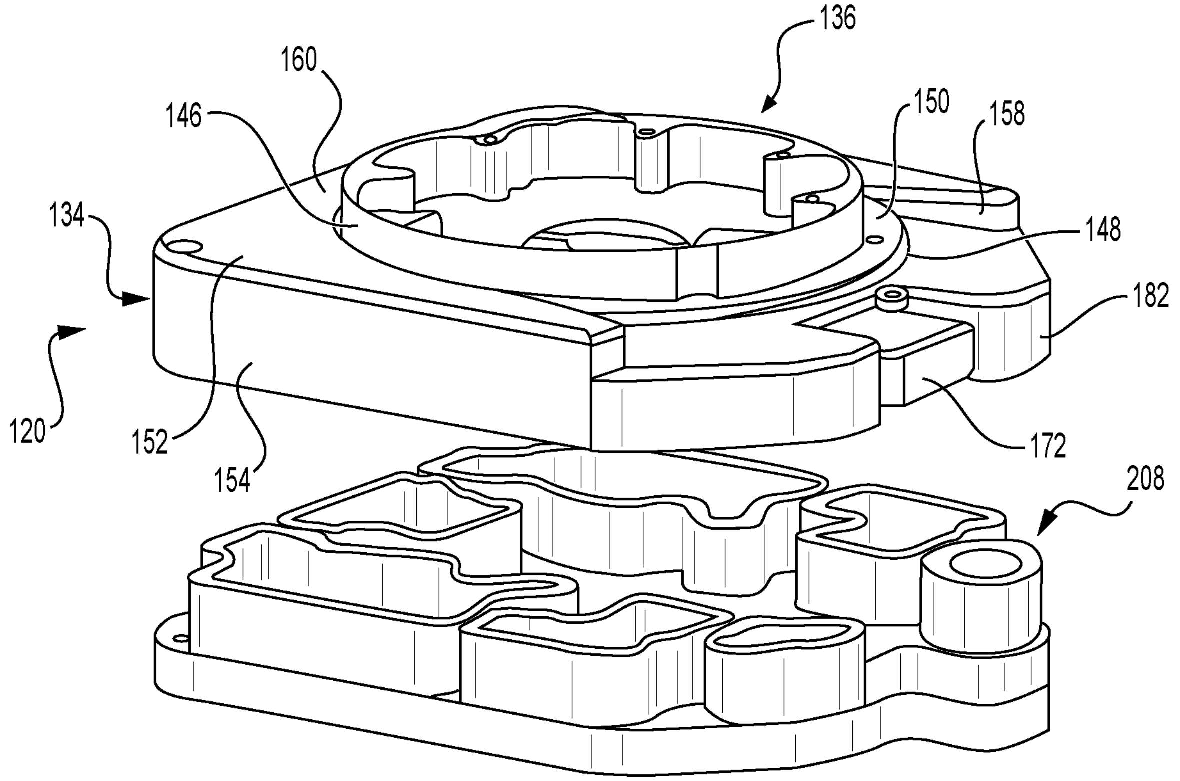
FIG. 24 is the base member of FIG. 16 and a damping member, according to certain other embodiments of the present disclosure.

The coupling lock mechanism 170, best seen in FIGS. 22 and 23, comprises an actuator spring 184 resiliently biasing the actuator 172 outwardly to the neutral position, and a stop member spring 186 resiliently biasing the stop member 166 to the lock position. The actuator spring 184 and the stop member spring 186 extend in directions which are substantially transverse to one another.

The base member 134 comprises a plurality of spring loaded ball bearings 188 partially extending from recesses 190 formed in the planar contact portion 156 of the front side 152 of the base member 134 and engageable with corresponding recesses 192 defined in the planar contact face 144 of the release member 136. The spring loaded ball bearings 188 and the recesses 192 can guide the movement of the release member 136 relative to the base member 134.

Figure 21:
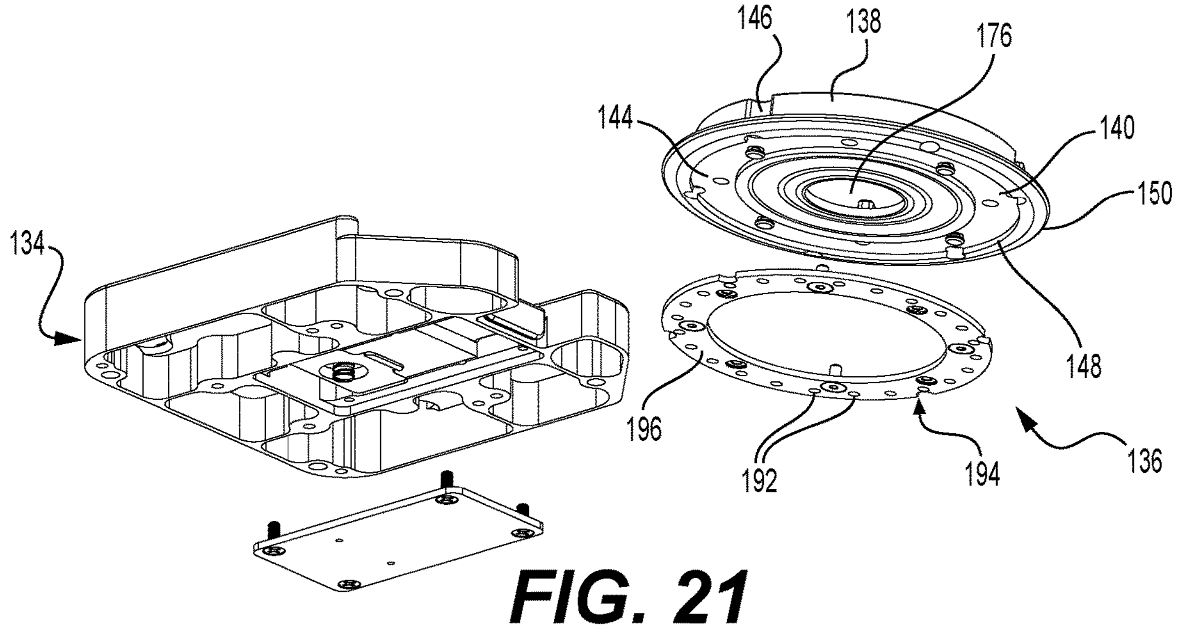
FIG. 21 is an exploded view of the base member and the release member of FIG. 16, according to certain other embodiments of the present disclosure.

In certain embodiments, the planar contact face 144 of the release member 136 comprises an anti-friction layer for reducing or minimizing friction between the contact faces 144, 156 of the release member 136 and the base member 134. As illustrated in FIGS. 21 to 23, the anti-friction layer comprises a disc 194 attached to the release member 136 and with an outer face 196 which is the planar contact face 144 and having anti-friction properties. In this embodiment, the recesses 192 for receiving the spring loaded ball bearings 188 are formed in the disc 194. In other embodiments, the anti-friction layer comprises a coating. The anti-friction layer may comprise any material that reduces friction between the base member 134 and the release member 136.

The connecting device 120 further comprises a top plate 198 attachable to the collar 146 of the release member 136 and attachable to the equipment 12. As best seen in FIG. 16, the top plate 198 is attached to the collar 146 by fasteners 200, such as screws. The top plate 198 has an opening formed therein.

In certain embodiments (for example as illustrated in FIGS. 16 to 24), when the base member 134 and the release member 136 are coupled together and in the lock position, the release member 136 is rotatable within the pocket 162 whilst maintaining the coupling. In this respect, the perimeter 148 of the plate-like body 138 of the release member 136 is circular in shape, the stop member 166 of the base member 134 is positioned substantially centrally of the planar contact portion 156, and the opening 176 of the release member 136 is positioned substantially centrally of the plate-like body 138, such that the release member 136 can be rotated within the pocket 162 when the stop member 166 is in the lock position. The stop member 166 can be considered to function also as a pivot point in these embodiments.

Figure 25:
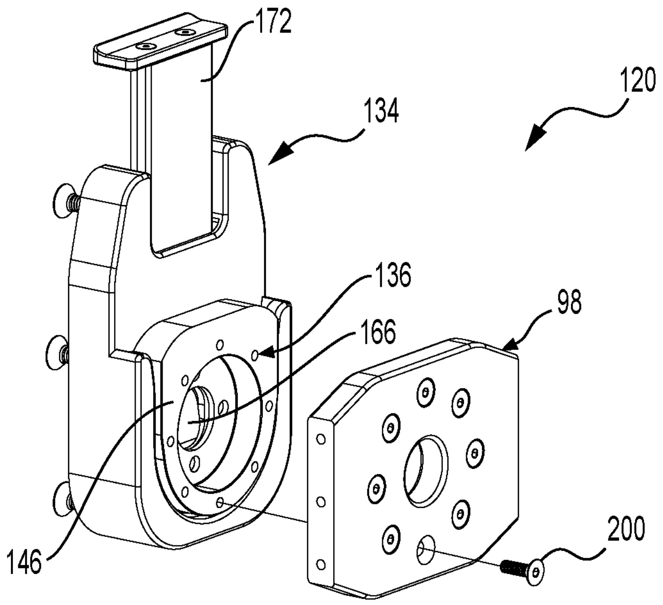
FIG. 25 is a connecting device comprising a base member, a release member, and a top plate, according to certain other embodiments of the present disclosure.
Figure 26:
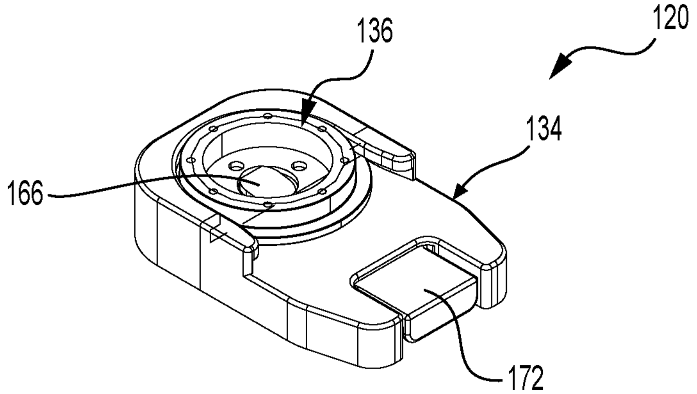
FIG. 26 is the connecting device of FIG. 25, with the top plate removed for clarity, and including a circular member, according to certain embodiments of the present disclosure.

In certain other embodiments (for example as illustrated in FIGS. 25 and 26), when the base member 134 and release member 136 are coupled together and in the lock position, the release member 136 is not rotatable within the pocket 162. In this respect, the perimeter 148 of the plate-like body 138 of the release member 136 has an eccentric shape such that the release member 136 is not rotatable in the pocket 162 of the base member 134. The perimeter 148 of the release member 136 may have a shape which is a multi-faceted geometric form. This embodiment of the connecting device 120 may be used when rotation of the equipment 12 is not required. In certain embodiments, the release member 136 further comprises a circular member 206 which is rotatable within the pocket 162 (FIG. 26).

In certain embodiments, the connecting device 120 is further provided with a damping member 208 (FIG. 24) attachable to the back side 154 of the base member 134 and arranged to be positioned between the base member 134 and the surface in use. The damping member 208 is arranged to absorb vibrations and shocks, and/or reduce energy transmission. In certain embodiments, the damping member 208 is made of any suitable material such as elastomeric materials.

Returning back to the equipment frame 96 to which the positioning member is mounted, in certain embodiments, it is provided with at least the base member 134 of one or more connecting devices 120. The corresponding release members 136 would be attached to the equipment 12, such as on a base of the equipment 12.

For example, in FIGS. 5A-7, the base members 134 of three connecting devices 120 are provided on the equipment frame 96, more specifically one base member 134 attached to the vertical arm close to the cross-bar, and two other base members 134 attached to the platform 46 at a distal end of the vertical arms. The connecting device 120 provided close to the cross-bar corresponds to the non-rotatable embodiment illustrated in FIGS. 25 and 26. The one or more connecting devices 120 may have the same or different width.

Certain embodiments of connecting devices which could be used with the present coupling system, are described in U.S. 62/915,806 filed Oct. 16, 2019 and PCT/CA2020/051329 filed 2 Oct. 2020 and PCT/CA2020/051392 filed 16 Oct. 2020, the contents of which are herein incorporated by reference.

Variations and modifications will occur to those of skill in the art after reviewing this disclosure. The disclosed features may be implemented, in any combination and subcombinations (including multiple dependent combinations and subcombinations), with one or more other features described herein. The various features described or illustrated above, including any components thereof, may be combined or integrated in other systems. Moreover, certain features may be omitted or not implemented. Examples of changes, substitutions, and alterations are ascertainable by one skilled in the art and could be made without departing from the scope of the information disclosed herein.

It should be appreciated that the present technology is not limited to the particular embodiments described and illustrated herein but includes all modifications and variations falling within the scope of the technology as defined in the appended claims.

The invention claimed is:

1. A coupling system for releasably coupling equipment to a patient transport system, the coupling system comprising:

a base member connectable to the patient transport system, and a positioning member connectable to an equipment frame to which the equipment is releasably connectable;

the base member comprising:

a recessed portion for receiving an end portion of the positioning member; and a retractable stop member in the recessed portion and moveable between: an extended position in which the retractable stop member extends into the recessed portion, and a recessed position in which the retractable stop member is retracted from the recessed portion, the retractable stop member being resiliently biased to the extended position;

the positioning member comprising:

an end portion sized and shaped to be received in the recessed portion of the base member and to selectively engage with the retractable stop member when the positioning member is positioned in the recessed portion to releasably couple the positioning member to the base member; and the equipment frame comprising at least one arm configured to be releasably coupled to the frame of the patient transport system when the positioining member is coupled to the base member.

2. The coupling system of claim 1, further comprising an actuation system for actuating the retractable stop member between the extended position and the retracted position, wherein the actuation system comprises an actuator for moving the retractable stop member to the retracted position from the extended position, and a resilient member for resiliently biasing the retractable stop member towards the extended position.

3. The coupling system of claim 1, wherein the base member has a three part configuration, (i) an upper portion; (ii) a lower portion connected to the upper portion, and (iii) a retractable stop member portion, including the retractable stop member, moveably arranged between the upper portion and the lower portion.

4. The coupling system of claim 3, wherein the upper portion comprises an upper body having the recessed portion defined therein; the lower portion comprises a lower body having an upper face, the upper face being adapted to moveably house the retractable stop member portion in a recess; and the retractable stop member portion comprises a plate portion, sized and shaped to be received in the recess of the upper face of the lower body, and the retractable stop member extending upwardly from the plate portion.

5. The coupling system of claim 4, wherein the plate portion of the retractable stop member portion comprises an opening for movingly receiving a pin.

6. The coupling system of claim 1, wherein the recessed portion is defined by a wall extending circumferentially around the base, there being provided an open access area without the wall through which the positioning member can be inserted and removed.

7. The coupling system of claim 6, wherein the recessed portion has a plurality of sides, and the wall extends along all but one of the plurality of sides which is the open access end.

8. The coupling system of claim 1, further comprising a clamp for attaching the base member to the patient transport system, the clamp attachable to a portion of the base member with a fastener.

9. The coupling system of claim 1, further comprising at least one arm extending from the base member, the at least one arm attachable to the patient transport system or being integral with the patient transport system.

10. The coupling system of claim 1, wherein the positioning member end portion comprises an opening for receiving the retractable stop member when the retractable stop member is in the extended position.

11. The coupling system of claim 1, the equipment frame including a base member of a connecting device, the base member of the connecting device being attachable to the equipment.

12. The coupling system of claim 11, wherein the connecting device further comprises a release member connectable to the equipment, the base member and the release member being releasably connectable together in a coupled position which can be locked;

the base member having a front face including a contact portion for contacting a contact face of the release member;

the release member comprising a body which is configured to be received in a pocket on the front face of the base member, when the base member and the release member are in the coupled position, the pocket having an open access end through which the release member can be slidingly inserted and removed from the pocket;

the base member including a stop member moveable, by an actuator, between a lock position in which the stop member interengages with the release member to prevent removal of the release member from the pocket of the base member, and a release position in which the release member can be separated from the base member.

13. The coupling system of claim 12, wherein the base member of the connecting device has a shoulder extending around the contact portion to define the pocket for receiving the release member, the shoulder engageable with a portion of a flange of the release member when the release member is positioned on the base member.

14. The coupling system of claim 1, wherein the equipment frame comprises a cross-bar to which the base member is attached.

15. The coupling system of claim 14, wherein the equipment frame comprises at least one vertical arm extending from the cross-bar and at least one support surface for supporting medical equipment.

16. The coupling system of claim 1, further comprising at least one guide member removably attached to the frame and configured to receive the at least one arm of the equipment frame.

17. The coupling system of claim 16, wherein the at least one arm is horizontal and configured to be slidably received in the at least one guiding member.

18. A patient transport system comprising:

a frame having a patient support surface attached thereto, the frame including a coupling system comprising:

a base member connectable to the patient transport system, and a positioning member connected to an equipment frame to which the equipment is releasably connectable;

the base member comprising:

a recessed portion for receiving an end portion of the positioning member; and a retractable stop member in the recessed portion and moveable between: an extended position in which the retractable stop member extends into the recessed portion, and a recessed position in which the retractable stop member is retracted from the recessed portion, the retractable stop member being resiliently biased to the extended position;

the positioning member comprising:

an end portion sized and shaped to be received in the recessed portion of the base member and to selectively engage with the retractable stop member when the positioning member is positioned in the recessed portion to releasably couple the positioning member to the base member; and the equipment frame comprising at least one arm configured to be releasably coupled to the frame when the positioning member is coupled to the base member.

19. The transport system of claim 18 further comprising: at least one guide member connected to the frame.

20. The patient transport system of claim 19, wherein the patient transport system further includes a supporting rail assembly connected to the at least one guide member and/or to the frame of the patient transport system.

* * * * *